United States Patent
Bellini, III et al.

(10) Patent No.: US 10,318,901 B2
(45) Date of Patent: Jun. 11, 2019

(54) SYSTEMS AND METHODS FOR BUSINESS MANAGEMENT USING PRODUCT DATA WITH PRODUCT CLASSES

(71) Applicant: ConnectWise Inc., Tampa, FL (US)

(72) Inventors: Arnold Bellini, III, Tampa, FL (US); Linda Brotherton, Tampa, FL (US); Robert Isaacs, Tampa, FL (US)

(73) Assignee: Connectwise, LLC, Tampa, FL (US)

( * ) Notice: Subject to any disclaimer, the term of this patent is extended or adjusted under 35 U.S.C. 154(b) by 89 days.

(21) Appl. No.: 13/837,300

(22) Filed: Mar. 15, 2013

(65) Prior Publication Data

US 2014/0278694 A1    Sep. 18, 2014

(51) Int. Cl.
*G06Q 10/00* (2012.01)
*G06Q 10/06* (2012.01)

(52) U.S. Cl.
CPC ............... *G06Q 10/06313* (2013.01)

(58) Field of Classification Search
CPC ................................ G06Q 10/06313
See application file for complete search history.

(56) References Cited

U.S. PATENT DOCUMENTS

| | | | |
|---|---|---|---|
| 5,758,327 A | 5/1998 | Gardner et al. | |
| 5,758,328 A | 5/1998 | Giovannoli | |
| 5,758,331 A | 5/1998 | Johnson | |
| 5,802,493 A | 9/1998 | Sheflott et al. | |
| 5,808,894 A | 9/1998 | Wiens et al. | |
| 6,085,169 A | 7/2000 | Walker et al. | |
| 6,141,653 A | 10/2000 | Conklin et al. | |
| 6,226,675 B1 * | 5/2001 | Meltzer et al. | 709/223 |
| 6,356,909 B1 | 3/2002 | Spencer | |
| 6,418,415 B1 | 7/2002 | Walker et al. | |
| 6,801,333 B1 | 10/2004 | Weiss | |
| 6,898,580 B1 * | 5/2005 | Curran | G06F 17/50 700/105 |
| 6,901,407 B2 | 5/2005 | Curns et al. | |
| 7,050,874 B1 * | 5/2006 | Tenorio | G06Q 10/087 700/107 |
| 7,072,857 B1 | 7/2006 | Calonge | |
| 7,092,968 B1 * | 8/2006 | Ebel et al. | |

(Continued)

OTHER PUBLICATIONS

"An investigation into the use of ERP systems in the service sector", V Botta-Genoulaz, PA Millet—International Journal of Production Economics, 2006—Elsevier.*

(Continued)

*Primary Examiner* — Jonathan G Sterrett
(74) *Attorney, Agent, or Firm* — Foley & Lardner LLP

(57) ABSTRACT

Systems and methods of the present disclosure facilitate managing a business. In some embodiments, the system includes a product data module and a plurality of business process modules executing on at least one processor of a server. The product data module may be configured to store at least one product description. Responsive to a first user, the system may associate a product class with a first description. Responsive to a second user, the system may associate a first product description with a first of the business process modules. The system may be configured to select a second business process module based on the product class and update the second business process module with the first product description.

18 Claims, 40 Drawing Sheets

(56) References Cited

U.S. PATENT DOCUMENTS

| | | | |
|---|---|---|---|
| 7,143,051 | B1 | 11/2006 | Hanby et al. |
| 7,302,401 | B1 | 11/2007 | Tervonen |
| 7,440,911 | B1* | 10/2008 | Fors ................. G06Q 30/02 705/26.4 |
| 7,516,088 | B2 | 4/2009 | Johnson et al. |
| 7,546,346 | B2 | 6/2009 | Ouchi |
| 7,606,739 | B1 | 10/2009 | Johnson |
| 7,702,736 | B2 | 4/2010 | Ouchi |
| 7,702,737 | B2 | 4/2010 | Ouchi |
| 7,707,259 | B2 | 4/2010 | Ouchi |
| 7,836,103 | B2 | 11/2010 | Li et al. |
| 7,908,200 | B2 | 3/2011 | Scott et al. |
| 7,962,358 | B1* | 6/2011 | Fernandez et al. ......... 705/7.23 |
| 8,005,910 | B2 | 8/2011 | Ouchi |
| 8,306,908 | B1 | 11/2012 | Barker et al. |
| 8,374,896 | B2 | 2/2013 | Engler et al. |
| 8,612,275 | B1* | 12/2013 | Crum et al. ................ 705/7.13 |
| 8,639,553 | B1* | 1/2014 | Knauth et al. ............. 705/7.22 |
| 2001/0056362 | A1* | 12/2001 | Hanagan et al. ................. 705/7 |
| 2002/0016729 | A1* | 2/2002 | Breitenbach et al. ............ 705/9 |
| 2002/0026356 | A1 | 2/2002 | Bergh et al. |
| 2002/0069154 | A1 | 6/2002 | Fields |
| 2002/0078046 | A1 | 6/2002 | Uluakar et al. |
| 2002/0087391 | A1 | 7/2002 | Williams |
| 2002/0116210 | A1 | 8/2002 | Medina et al. |
| 2002/0116300 | A1* | 8/2002 | DeBusk ................. G06F 17/30 705/29 |
| 2002/0123969 | A1 | 9/2002 | Foertsch et al. |
| 2002/0165724 | A1 | 11/2002 | Blankesteijn |
| 2003/0004854 | A1 | 1/2003 | Greene et al. |
| 2003/0014326 | A1 | 1/2003 | Ben-Meir et al. |
| 2003/0046153 | A1 | 3/2003 | Robibero |
| 2003/0061266 | A1 | 3/2003 | Ouchi |
| 2003/0135425 | A1 | 7/2003 | Leavitt |
| 2003/0154144 | A1* | 8/2003 | Pokorny ............ G05B 13/0285 705/28 |
| 2003/0179870 | A1 | 9/2003 | Desa et al. |
| 2003/0182172 | A1 | 9/2003 | Claggett et al. |
| 2004/0002885 | A1* | 1/2004 | Levy ............................... 705/8 |
| 2004/0254950 | A1 | 12/2004 | Musgrove et al. |
| 2005/0021424 | A1 | 1/2005 | Lewis et al. |
| 2005/0171918 | A1* | 8/2005 | Eden ..................... G06Q 30/02 705/400 |
| 2005/0240451 | A1 | 10/2005 | Johnson et al. |
| 2005/0240881 | A1* | 10/2005 | Rush ..................... G06F 3/0482 715/851 |
| 2006/0106685 | A1 | 5/2006 | Cheng et al. |
| 2006/0122892 | A1 | 6/2006 | Fletcher et al. |
| 2006/0184715 | A1 | 8/2006 | Gikas et al. |
| 2007/0016487 | A1 | 1/2007 | Calonge |
| 2007/0022404 | A1 | 1/2007 | Zhang et al. |
| 2007/0088621 | A1 | 4/2007 | Hamilton et al. |
| 2007/0150855 | A1 | 6/2007 | Jeong |
| 2007/0192362 | A1* | 8/2007 | Caballero ............. G06Q 10/06 |
| 2008/0034425 | A1* | 2/2008 | Overcash et al. ............. 726/22 |
| 2008/0228582 | A1 | 9/2008 | Fordyce et al. |
| 2008/0243565 | A1 | 10/2008 | Gregory |
| 2008/0243654 | A1* | 10/2008 | Wernze et al. ................ 705/34 |
| 2009/0109033 | A1* | 4/2009 | Salvat .................. G01S 5/0027 340/572.1 |
| 2009/0125359 | A1 | 5/2009 | Knapic et al. |
| 2009/0222317 | A1 | 9/2009 | Allen et al. |
| 2009/0222356 | A1 | 9/2009 | Courchesne et al. |
| 2010/0030665 | A1 | 2/2010 | Johnson |
| 2010/0070329 | A1 | 3/2010 | Engler et al. |
| 2010/0131296 | A1* | 5/2010 | Knutson ............... G06Q 10/10 705/3 |
| 2010/0217616 | A1 | 8/2010 | Colson et al. |
| 2010/0280867 | A1 | 11/2010 | Diaz et al. |
| 2011/0093328 | A1 | 4/2011 | Woolcott |
| 2011/0252019 | A1 | 10/2011 | Lamothe |
| 2011/0276427 | A1 | 11/2011 | McNall et al. |
| 2012/0215687 | A1 | 8/2012 | Jain |
| 2012/0215783 | A1 | 8/2012 | Musgrove et al. |
| 2012/0221393 | A1 | 8/2012 | Ouimet et al. |
| 2012/0259684 | A1 | 10/2012 | Ochiai |
| 2012/0271730 | A1 | 10/2012 | McNall et al. |
| 2012/0323727 | A1 | 12/2012 | Batra et al. |
| 2012/0330929 | A1 | 12/2012 | Kowalski et al. |
| 2013/0110667 | A1* | 5/2013 | DeBusk ................ G06Q 30/06 705/26.5 |
| 2013/0246113 | A1* | 9/2013 | Mantravadi et al. ........ 705/7.15 |

OTHER PUBLICATIONS

"Hospital resource planning: concepts, feasibility, and framework", AV Roth, R Dierdonck—Production and operations . . . , 1995—Wiley Online Library.*

Launching professional services automation: Institutional entrepreneurship for information technology innovations P Wang, EB Swanson—Information and Organization, 2007—Elsevier.*

A case study of the ERP system application in the aviation maintenance department of H company L Haigang, Y Wanling—Service Systems and Service . . . , 2008—ieeexplore.ieee.org.*

Professional Services Automation: A Knowledge Management Approach Using LSland Domain Specific Ontologies. V Kashyap, SR Dalal, C Behrens—FLAIRS Conference, 2001—aaai.org.*

Enterprise Resource Planning and Integration. K Kurbel—2005—mfile.narotama.ac.id.*

"Agent-based e-commerce in case of mass customization", K Turowski—International Journal of Production Economics, 2002—Elsevier.*

Customer relationship management in the pharmaceutical industry T Puschmann, R Alt—. . . Sciences, 2001. Proceedings of the 34th . . . , 2001—ieeexplore.ieee.org.*

Evaluation of integration technology approaches in the healthcare supply chain S Kitsiou, A Matopoulos, V Manthou . . . —. . . Journal of Value . . . , 2007—inderscienceonline.com.*

Using electronic data interchange (EDI) to improve the efficiency of accounting transactions SW Anderson, WN Lanen—The Accounting Review, 2002—aaajournal.org.*

"Assessment of benefits from product configuration systems" L Hvam, A Haug, NH Mortensen—. . . on Configuration, ECAI 2010, the 19th . . . , 2010—orbit.dtu.dk.*

Design and development of a business-to-business integration module for Openbravo ERP JM Bernal Alejo—2011—academica-e.unavarra.es.*

1945 Snap-On Tools Price Catalog, Ebay Auction, retrieved from the Internet Jul. 22, 2017, pp. 1-3. pages.*

Connectwise, Inc., ConnectWise Documentation v2011.3, Product Search and Products Screen, Mar. 2012, Tampa, Florida.

Connectwise, Inc., ConnectWise Documentation v2011.3, References Tab, Jun. 2011, Tampa, Florida.

Connectwise, Inc., Release Notes Version 2011.3, Aug. 2013, Tampa, Florida.

Siebel Systems, Inc., Siebel Professional Services Automation Guide, eBusiness Applications, Version 7.0, 10PA1-PS00-07000, Sep. 2001, San Mateo, California.

Siebel Systems, Inc., Siebel Professional Services Automation Guide, Version 7.7, Nov. 2004, San Mateo, California.

* cited by examiner

SYSTEMS AND METHODS FOR BUSINESS MANAGEMENT USING PRODUCT DATA WITH PRODUCT CLASSES

FIELD OF THE DISCLOSURE

The present disclosure generally relates to the use of resource planning systems to manage and automate business processes. More specifically, the present disclosure relates to using product data to propagate information between multiple business processes within an organization using a resource planning system, based on product classes associated with the product data.

BACKGROUND OF THE INVENTION

Different business units using a resource planning system can interact with each other using a shared data resource that serves as a repository for all of the information used by the system. The structure of the data within the shared data resource can be customized and specialized to the software architecture of the interfaces used by the different business units within the organization. This can make it challenging to customize or modify the data sharing capabilities between the different business units, and can result in a data structure that is challenging for the average end user to work with.

Furthermore, resource planning systems may treat products as single entities. Treating products as single entities may require users of the system to understand the details of multiple, different products, and how the different products work together. In operation, the resource planning system may also disclose information about the products to customers, which may be detrimental to the business organization.

SUMMARY OF THE INVENTION

Systems and methods of the present disclosure facilitate managing a business. For example, the present disclosure provides a product data module that stores product descriptions. The product data module can be configured to associate a product class with a product description, responsive to user input. The present disclosure provides a plurality of business process modules. Responsive to user input, a product description can be associated with a first business process module. Based on the product class of the product that was associated with the first business process modules, the present disclosure can be configured to update a second business process module with the product data from the first business module.

At least one aspect of the present disclosure is directed to a system for managing a business. In some embodiments, the system includes a product data module and a plurality of business process modules. The product data module can be configured to store at least one product description. The product data module can be configured to associate, responsive to a first user, a product class with a first product description. A first business process module can be configured to associate, responsive to a second user, the first product description with the first business process module. The system can be configured to select a second business process module based on the product class, and then update the second business process module with the first product description.

At least one aspect of the present disclosure is directed to a method for managing a business. In some embodiments, the method can include storing, by a product data module executing on at least one processor of a server, at least one product description. In some embodiments, the method can include associating, responsive to a first user, a product class with a first product description. In some embodiments, the method can include associating, responsive to a second user, the first product description with a first of a plurality of business process modules executing on the server. In some embodiments, the method can include selecting, based on the product class, a second business process module. In some embodiments, the method can include updating the second business process module with the first product description.

At least one aspect is directed to a system for managing a business. In some embodiments, the system can include a product data module and a plurality of business process modules executing on at least one processor of a server. In some embodiments, the at least one processor is configured to store a first product description of a first product in the product data module. The first product description can be in a format associated with a first business process module. The processor can store the first product description in a memory communicatively coupled to the at least one processor. The at least one processor can identify a product class that includes at least one of a labor product, a parts product, and an agreements product. The product class can be identified based on the first product description. The at least one processor can select, based on the product class, a second business process module. The second business process module can be configured to interface with the product data module. The at least one processor can transmit, to the selected second business process module, the first product description of the first product. The at least one processor can control the second business module to execute a second business process based on at least one of the first product description and the product class.

At least one aspect of the present disclosure is directed to a system for grouping products. In some embodiments, the system includes a product data module and at least one business process module. The product data module can be configured to store a first plurality of product descriptions. The product data module can be configured to associate, responsive to a first user, a product class with at least one of the first plurality of product descriptions. The product data module can be configured to select, responsive to a second user, a second plurality of product descriptions. The system can be configured to associate, responsive to a third user, the second plurality of product descriptions with a first business process module. The system can be configured to select, based on the product class associated with a second product description in the second plurality of product descriptions, a second business process module, and then update the second business process module with the second product description.

At least one aspect of the present disclosure is directed to a method for grouping products. In some embodiments, the method can include storing, by a product data module executing on at least one processor of a server, at least one product description. In some embodiments, the method can include associating, responsive to a first user, a product class with a first of the product descriptions. In some embodiments, the method can include selecting, responsive to a second user, a second plurality of product descriptions from the product data module. In some embodiments, the method can include associating, responsive to a third user, the second plurality of product descriptions with a first of a plurality of business process modules executing on the server. In some embodiments, the method can include selecting, based on the product class associated with a second process description in the second plurality of product descriptions, a second business process module. In some embodiments, the method can include updating the second business process module with the second product description.

At least one aspect of the present disclosure is directed to a non-transitory computer readable storage medium that includes instructions to manage a business via a product data module and a plurality of business process modules. In some embodiments, the instructions can include instructions to store, in a memory a first product description of a first product in the product data module. The first product description can be in a format associated with a first business process module. The instructions can include instructions to identify, based on the first product description, a product class. The product class can include at least one of a labor product, a parts product, and an agreements product. The instructions can include instructions to select, based on the product class, a second business process module. The second business process module can interface with the product data module. The instructions can include instructions to transmit, to the selected second business process module, the first product description of the first product. The instructions can include instructions to control the second business module to execute a second business process based on at least one of the first product description and the product class.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 19 is an illustrative example of an embodiment of a user interface for managing the products associated with a single sales opportunity.

FIG. 23 is an illustrative example of an embodiment of a user interface for managing procurement.

FIG. 28 is an illustrative example of an embodiment of an invoice for a customer.

Like reference numbers and designations in the various drawings indicate like elements.

DETAILED DESCRIPTION

Systems and methods of the present disclosure allow a resource planning system to manage and automate business processes using a single, unifying product data format to convey product information to/from various business processes. In some embodiments, systems and methods of the present disclosure facilitate the operation of the resource planning system by grouping multiple products. The product data format can include various classes or sub-classes of products, including, e.g., labor, parts and agreements. In an illustrative example, a marketing department can use a quoting business process to create a quote for installing a new networking solution. This quote can include product data such as labor products (e.g., man-hours to install and setup equipment, train office personnel), parts products (e.g., routers, cables, firewall server), and agreements products (e.g., warranty, on-going maintenance agreement). Accordingly, the resource planning system can interpret the quote as a product, and convey this product data to a sales process which can sell the product to a customer. For example, the sales process can refer to the elements of the product data (e.g., the quote) to complete a sale, where a sale is complete upon the customer agreeing to each element of the product (e.g., labor terms, parts terms, and agreement terms). Once a customer agrees to the elements of a quote, the system can convert the quote product data into a sales product data because the product has been sold. The sale product data can include the elements of the quote product data and be in the same format. Furthermore, other modules of the resource planning system can use the product data to facilitate various processes. For example, a sales order module can use the sale product data, which can match the quote product data, to make the corresponding purchases on behalf of the customer.

Figure 1A:
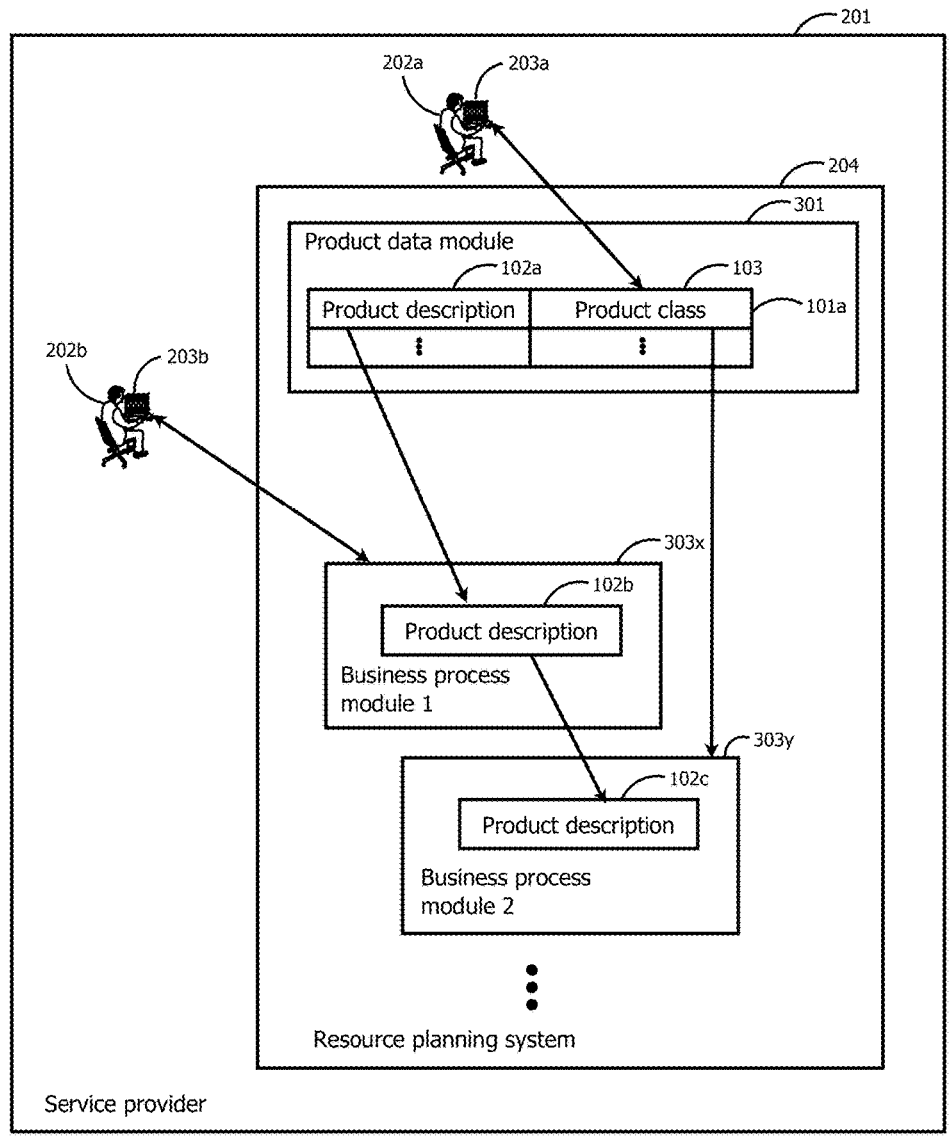
FIG. 1A is an illustrative block diagram of an embodiment of a system to manage a business.

FIG. 1A illustrates a block diagram of a system to manage a business. The business is a service provider 201 with a resource planning system 204. The resource planning system 204 has a product data module 301 that stores product information 101, with both a product description 102 and a product class 103. A staff member 202a uses a device 203a to update the product class 203 to match the product 101. The resource planning system 204 also has a number of business process modules 303. Another staff member 202b uses a device 203b to select a product 102a and associate it with a product 102b in a business process module 303x. The system then uses the product class 103 to select a second business process module 303y, and transfers the product information from the product 102b in the first business process module 303x to a product 102c in the second business process module 303y. The product class 103 of the product information 102b in the first business process module 303x can indicate how the product can affect the other business process modules 303 in the system, and therefore can indicate the selection of the second business process module 303y. In one embodiment, later described more completely with respect to FIG. 7, the same selection of the second business process module 303y is made for a given value of the product class 103. For example, if the product class 103 indicates that the product is a labor product, the second business process module 303y can be selected from at least one of a quoting process 303a, a delivery and setup process 303d, a project planning process 303e, an invoicing and collection process 303f, or a contract management process 303h. In another example, if the product class 103 indicates that the product is a parts product, the second business process module 303y can be selected from at least one of a quoting process 303a, a procurement process 303c, a delivery and setup process 303d, a project planning process 303e, an invoicing and collection process 303f, or a payables process 303g. In still another example, if the product class 103 indicates that the product is an agreements product, the second business process module 303y can be selected from at least one of a quoting process 303a, an invoicing and collection process 303f, a contract management process 303h, or a maintenance process 303i.

Figure 1B:
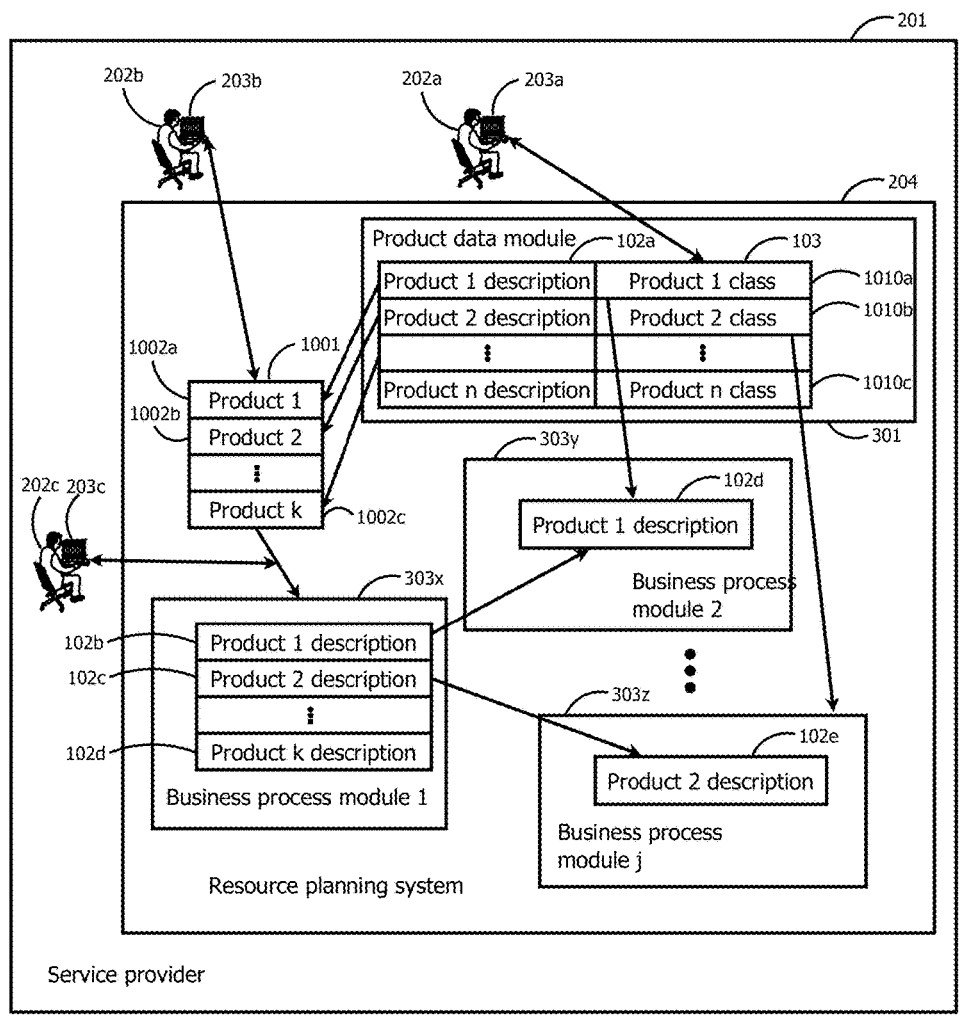
FIG. 1B is an illustrative block diagram of an embodiment of a system to group products.

FIG. 1B illustrates a block diagram of a system to group products. A service provider 201 uses a resource planning system 204 that contains a product data module 301 that stores a set of product descriptions 102. A user 202a can use a device 203a to interact with the system 204 and associate a product class 103 with each product description 102 to make a product 1010. Another user 202b can use a device 203b to interact with the system 204 to create a group of products 1001. The group 1001 represents an arbitrary collection of the products from the product data module 301. For example, the embodiment illustrated in FIG. 1B has a group 1001 with product 1 1002a through product k 1002k, representing a group of different products 1010 from the product data module 301.

The group of products 1001 now makes it much simpler for a third user 202c to use the related group of products created by the second user 202b in the business process modules 303 of the system 201. In the embodiment illustrated in FIG. 1B, the third user 202c uses a device 203c to interact with the system 204 and select the group 1001 for use by the business process module 1 303x. The products 1010 identified by the group 1001 are copied into the business process module 1 303x where they are stored 102b-102d.

At some later time, triggered either manually or automatically, the system copies the products from business process module 1 303x to other business process modules 303, based on the product class 103 assigned to the products. For example, in the embodiment illustrated in FIG. 1B, the class for product 1 1010a indicates that the product data 102b needs to be copied to business process module 2 303y, creating the copy 102d of the product. At the same time, the class for product 2 1010b indicates that the product data 102c needs to be copied to business process module j 303z, creating the copy 102e of the product.

According to various embodiments, the processes described herein can be implemented by the system or hardware components in response to the one or more processors executing an arrangement of instructions contained in memory. Such instructions can be read into memory from another computer-readable medium, such as a storage device. Execution of the arrangement of instructions contained in memory causes the system to perform the illustrative processes described herein. One or more processors in a multi-processing arrangement may also be employed to execute the instructions contained in memory. In alternative embodiments, hard-wired circuitry may be used in place of or in combination with software instructions to effect illustrative embodiments. Thus, embodiments are not limited to any specific combination of hardware circuitry and software.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Figure 2:
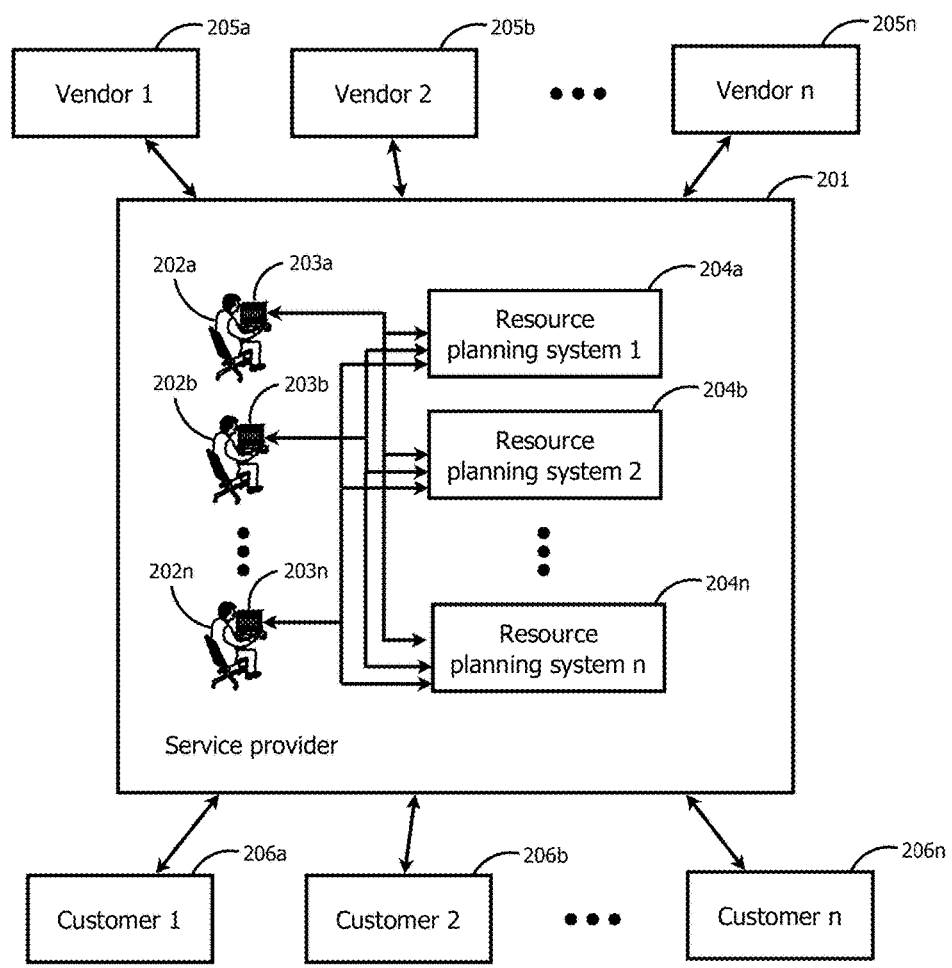
FIG. 2 is an illustrative block diagram of an embodiment of a service provider.

FIG. 2 illustrates a block diagram of a service provider 201 in accordance with an embodiment. The service provider 201 provides goods and services to customers 206. In one embodiment, the service provider 201 is an information technology (IT) service company that provides computer software, hardware, and maintenance to its customers 206. In another embodiment, the service provider 201 is a software product developer that provides the same software application to many different customers 206. In another embodiment, the service provider 201 is a custom software developer that provides different software applications, customized for specific needs, to each customer 206. In another embodiment, the service provider 201 is a web development company that provides the design and implementation of web sites to its customers 206. In another embodiment, the service provider 201 is a managed service provider (MSP) that services the computer hardware and software of its customers 206 for a fee (e.g., a fixed fee). In another embodiment, the service provider 201 is a hardware reseller that provides its customers 206 with computer hardware, installation, and setup. These embodiments are intended to be illustrative rather than limiting, and in still other embodiments, the service provider 201 provides its customers 206 with various combinations of the services described in these embodiments.

The service provider 201 employs a staff 202 to provide the services described. To support their work, the staff 202 uses one or more resource planning systems 204, accessing the resource planning systems 204 with devices 203. Devices 203 may be connected to the resource planning systems 204 either directly or through a network. In one embodiment, the resource planning systems 204 run internally at the service provider 201. In another embodiment, the resource planning systems 204 run externally, outside the service provider 201. In other embodiments, the resource planning systems 204 are a mixture of internal and external systems.

The network can include a local-area network (LAN), such as a company Intranet, a metropolitan area network (MAN), or a wide area network (WAN), such as the Internet or the World Wide Web. In some embodiments, there are multiple networks between the devices and the servers. In one of these embodiments, the network may be a public network, a private network, or may include combinations of public and private networks.

The network may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network may include a wireless link, such as an infrared channel or satellite band. The topology of the network may include a bus, star, or ring network topology. The network may include mobile telephone networks utilizing any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some embodiments, different types of data may be transmitted via different protocols. In other embodiments, the same types of data may be transmitted via different protocols.

The service provider interacts with vendors 205, which can include one or more of hardware vendors that supply physical hardware, software vendors that supply software applications, and service vendors that supply other services. In one embodiment, a vendor 205 is also a service provider, such as the service provider 201.

The one or more servers associated with the resource planning systems 204 or service provider devices 203 do not need to be physically proximate to each other or in the same machine farm. Thus, the servers logically grouped as a machine farm may be interconnected using a wide-area network (WAN) connection or a metropolitan-area network (MAN) connection. For example, a machine farm may include servers physically located in different continents or different regions of a continent, country, state, city, campus, or room. Data transmission speeds between servers in the machine farm can be increased if the servers are connected using a local-area network (LAN) connection or some form of direct connection.

Management of the servers may be de-centralized. For example, one or more servers may comprise components, subsystems and circuits to support one or more management services. In one of these embodiments, one or more servers provide functionality for management of dynamic data, including techniques for handling failover, data replication, and increasing robustness. Each server may communicate with a persistent store and, in some embodiments, with a dynamic store.

A server may include a file server, application server, web server, proxy server, appliance, network appliance, gateway, gateway, gateway server, virtualization server, deployment server, secure sockets layer virtual private network ("SSL VPN") server, or firewall.

In one embodiment, the server may be referred to as a remote machine or a node.

Figure 3:
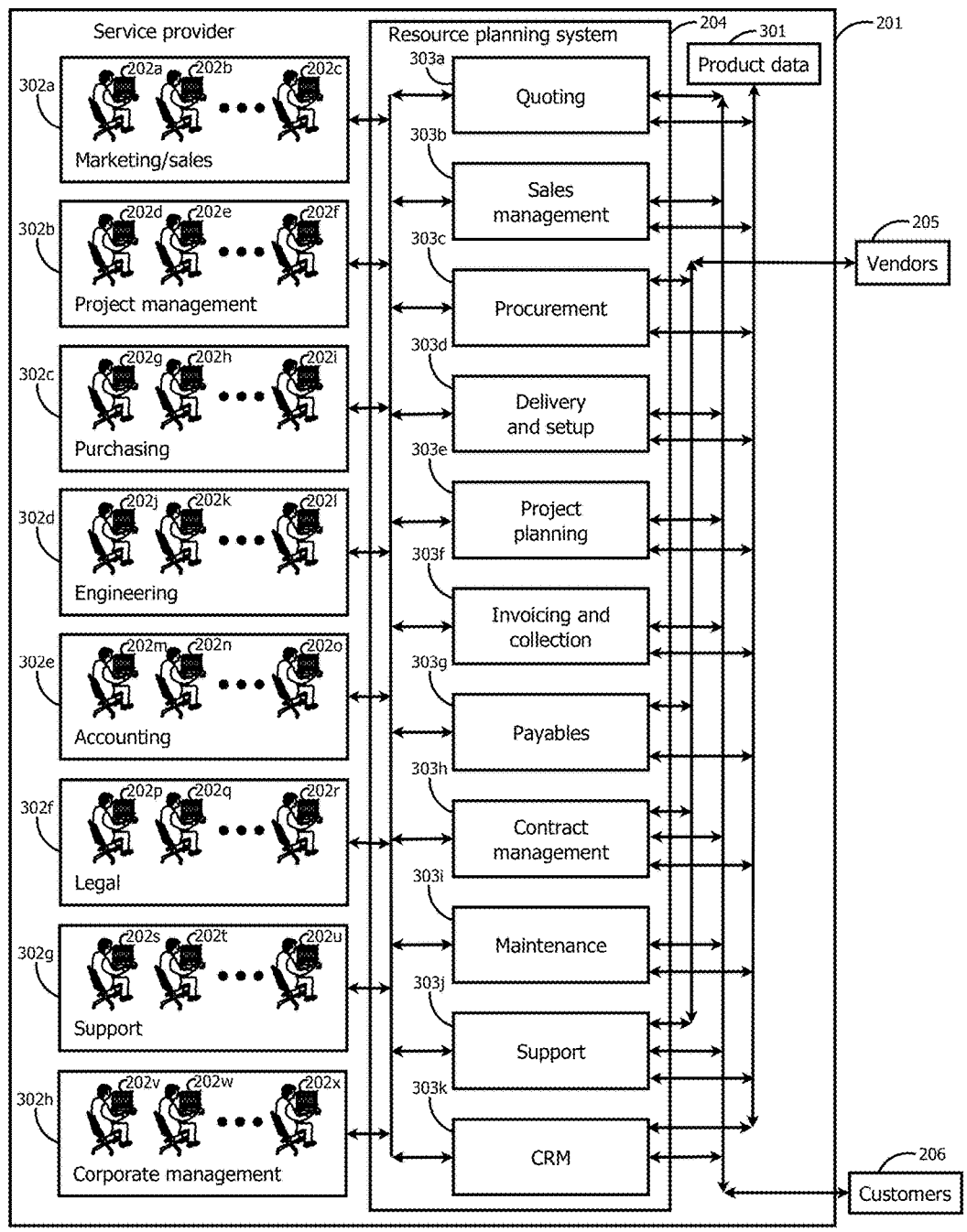
FIG. 3 is an illustrative block diagram of an embodiment of the business units and processes within a service provider.

FIG. 3 illustrates a block diagram of the business units 302 and business processes 303 within a service provider 201 in accordance with an embodiment. The staff 202 at the service provider 201 is organized into different business units 302. In one embodiment, the business units 302 can include at least one of the marketing/sales department 302a, the project management department 302b, the purchasing department 302c, the engineering department 302d, the accounting department 302e, the legal department 302f, the support department 302g, and the corporate management 302h. In some embodiments, such as smaller companies, a single staff member 202 is a member of more than one department 302. In other embodiments, there are different business units; the embodiment described is intended to be illustrative rather than limiting.

The marketing/sales department 302a is responsible for finding customers 206 and convincing the customers 206 to do business with the service provider 201. The project management department 302b is responsible for understanding the needs of customers 206 and providing detailed plans to the staff 202 to meet those needs. The purchasing department 302c is responsible for interacting with vendors 205 to procure and pay for goods and services provided by the vendors 205. The engineering department 302d is responsible for the technical operations of installing, setting up, and maintaining the goods and services provided to the customers 206. The accounting department 302e is responsible for managing all of the financial aspects of the service provider 201. The legal department 302f is responsible for agreements between the service provider 201 and customers 206, agreements between the service provider 201 and vendors 205, and any other legal issues involving the service provider 201. The support department 302g is responsible for helping customers 206 to resolve any problems they have with the goods and services that the service provider 201 provides. The corporate management 302h oversees the operation of the service provider 201 and is ultimately responsible for its success or failure.

The business units 302 use multiple business processes 303 to interact with vendors 205 and provide goods and services to customers 206. In some embodiments, these business processes 303 can include at least one of a quoting process 303a, a sales management process 303b, a procurement process 303c, a delivery and setup process 303d, a project planning process or project planning business process 303e, an invoicing and collection process 303f, a payables process 303g, a contract management process 303h, a maintenance process 303i, a support process 303j, and a customer relationship management (CRM) process 303k.

Business units 302 have the ability to interact with processes 303, and can do so from time to time. As will be seen in FIG. 4, business units 302 can have a preferred set of business processes 303 with which they interact on a more regular basis. For example, the vendors 205 can interact with the procurement process 303c, the payables process 303g, the contract management process 303h, and the support process 303j. In another example, the customers 206 can interact with the quoting process 303a, the sales management process 303b, the delivery and setup process 303d, the project planning process 303e, the invoicing and collection process 303f, the contract management process 303h, the maintenance process 303i, the support process 303j, and the CRM process 303k.

The quoting process 303a provides a quote to a customer 206 with the cost of a specific set of goods and services to be provided by the service provider 201. The sales management process 303b helps the marketing/sales department 302a to organize their activities efficiently and manage their activities with the customers 206. The procurement process 303c orders, receives, and processes goods and services from the vendors 205. The delivery and setup process 303d ensures that goods and services from the service provider 201 arrive at the customers 206 and are installed and configured properly. The project planning process 303e coordinates the resources of the service provider 201 in order to satisfy the commitments of the service provider 201 to the customers 206 efficiently and in a timely manner. The invoicing and collection process 303f delivers invoices to customers 206, notifies customers 206 when a payment is due and ensures that the customers 206 pay the service provider 201 in a timely manner. The payables process 303g facilitates the process that includes the service provider 201 paying the vendors 205 in a timely manner. The contract management process 303h can negotiate the terms of agreements between the service provider 201 and the customers 206, and can also negotiate the terms of agreements between the service provider 201 and the vendors 205. The maintenance process 303i facilitates the process that includes completing, by the service provider 201 in a timely manner, periodic tasks required by the customers 206. The support process 303j addresses product-related problems that the customers 206 are having, and can continue to work on those problems until they are resolved to the satisfaction of the customer 206. The CRM process 303k facilitates contact between the service provider 201 and customers 206 by maintaining contact information and company information, and providing convenient interfaces for using that information to initiate telephone calls, emails, text messages, letters, faxes, or other forms of communication.

The business processes 303 use the product data 301. The product data 301 is a key shared repository for data about the goods and services provided by the service provider 201. Systems and methods of the present disclosure can use product data 301 to serve as a unifying mechanism for the business processes 303, the business units 302 that use those business processes 303, and the staff 202 that are part of those business units 302.

FIG. 4 illustrates a block diagram of the relationships between the business units 302 and the business processes 303 within a service provider 201. Business units 302 can interact with business processes 303, and certain interactions may occur more frequently in normal business operations. The interactions described with respect to FIG. 4 are not intended to be limiting, but are intended to illustrate customary business practices.

Figure 4A:
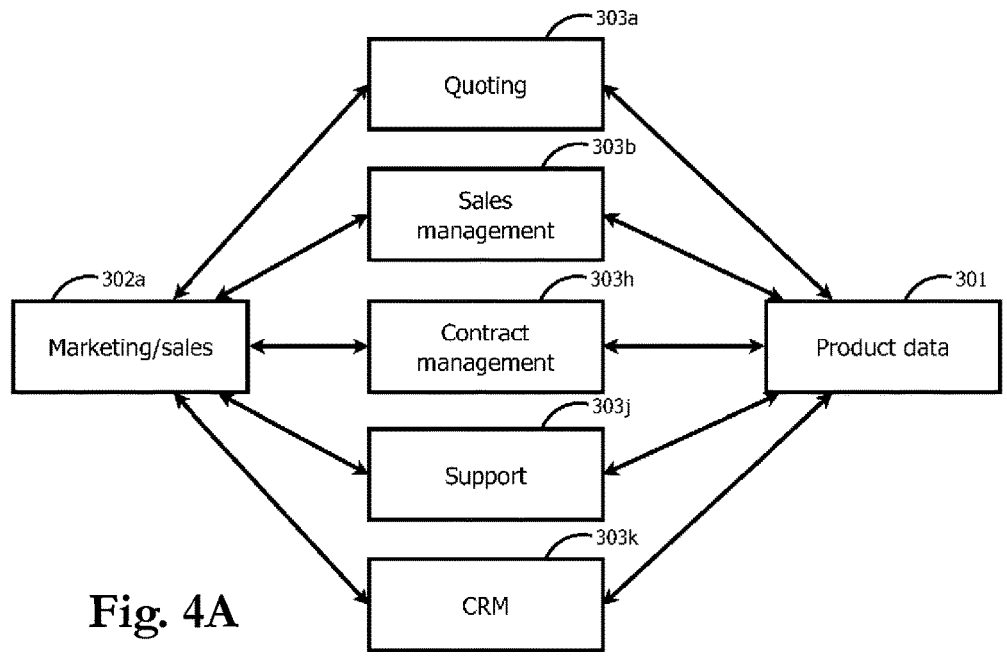
FIGS. 4A-H are illustrative block diagrams of embodiments of the relationships between the business units and the processes within a service provider.

FIG. 4a illustrates an exemplary interaction between the marketing/sales department 302a and various business processes including, e.g., at least one of the quoting process 303a, sales management process 303b, contract management process 303h, support process 303j, or CRM process 303k. The marketing/sales department 302a can drive the quoting process 303a by communicating with the customer 206 and arriving at an understanding of the customer's needs, then assembling the quote from goods and services in the product data 301, including the prices of those goods and services. The marketing/sales department 302a can interact with the sales management process 303b on a regular basis to find customers 306 and close orders with these customers. The marketing/sales department 302a can interact with the contract management process 303h to finalize agreements with customers 206 for products that may require ongoing service and payment. The marketing/sales department 302a can interact with the support process 303j for pre-sale support activity when, e.g., a prospective customer has a problem with a product or service and needs help from the support department 302g. The marketing/sales department 302a can use the CRM process 303k when the department attempts to contact a customer 206. In these interactions, the product data 301 can serve as the basis of interaction between the business processes 303, and can also serve as a common way for the marketing/sales department 302a to understand their interactions with those business processes.

Figure 4B:
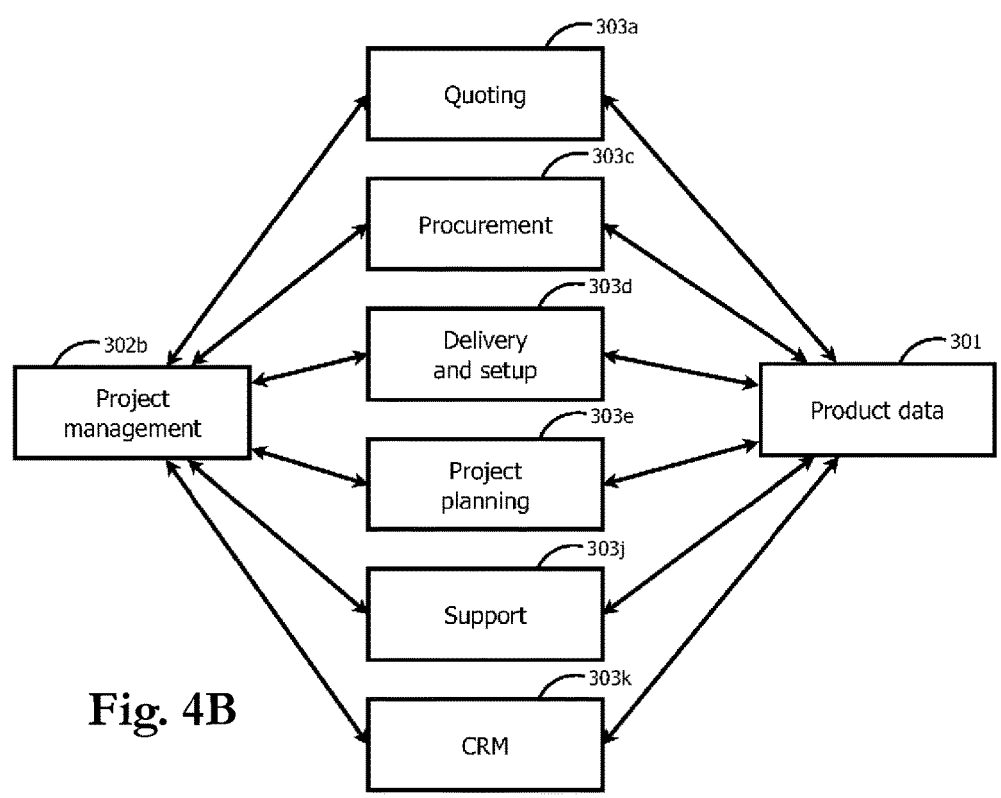

FIG. 4b illustrates an exemplary interaction between the project management department 302b and various processes including, e.g, the quoting process 303a, procurement process 303c, delivery and setup process 303d, project planning process 303e, support process 303j, or CRM process 303k. The project management department 302b can use the details from the quoting process 303a to build a project plan to deliver that quote, and can also integrate that project plan with other projects that are going on within the service provider 201. The project management department 302b can use the procurement process 303c to purchase external goods and services needed from vendors 205 in order to implement the project plan. The project management department 302b can use the delivery and setup process 303d to deliver the goods and services indicated by the project plan to the customer 206. The project management department 302b can interact with the support process 303j whenever there are unforeseen difficulties in implementing the project plan that must be resolved for the customer 206. The project management department 302b can use the CRM process 303k to contact a customer 206. In some or all of these interactions, the product data 301 can serve as the basis of interaction between the business processes 303, and can also serve as a common way for the project management department 302b to understand their interactions with those business processes.

Figure 4C:
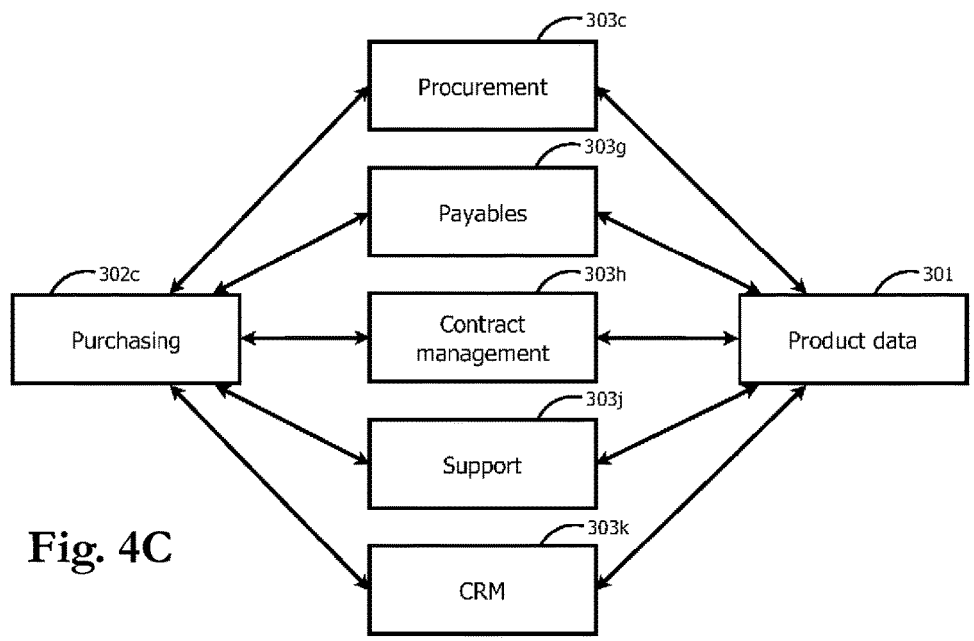

FIG. 4c illustrates an exemplary interaction between the purchasing department 302c and various business processes including, e.g., at least one of the procurement process 303c, payables process 303g, contract management process 303h, support process 303j, or CRM process 303k. The purchasing department 302c can manage the procurement process 303c to order goods and services from vendors 205 that are needed in order for the service provider 201 to meet its commitments to its customers 206. The purchasing department 302c can help to manage the payables process 303g to pay the vendors 205 in a timely manner and manage the cash flow of the service provider 201. The purchasing department 302c can interact with the contract management process 303h to get more favorable purchasing terms from vendors 205 by entering into longer term purchase agreements with them. The purchasing department 302c can also interact with the contract management process 303h to set up terms for services rendered by vendors 205 for the service provider 201 and its customers 206. The purchasing department 302c can interact with the support system 303j when a customer 206 has an issue concerning an interaction with a vendor 205 for which the purchasing department 302c is managing the relationship. The purchasing department 302c can use the CRM process 303k to contact a customer 206. In some or all of these interactions, the product data 301 can serve as the basis of interaction between the business processes 303, and can also serve as a common way for the purchasing department 302c to understand their interactions with those business processes.

Figure 4D:
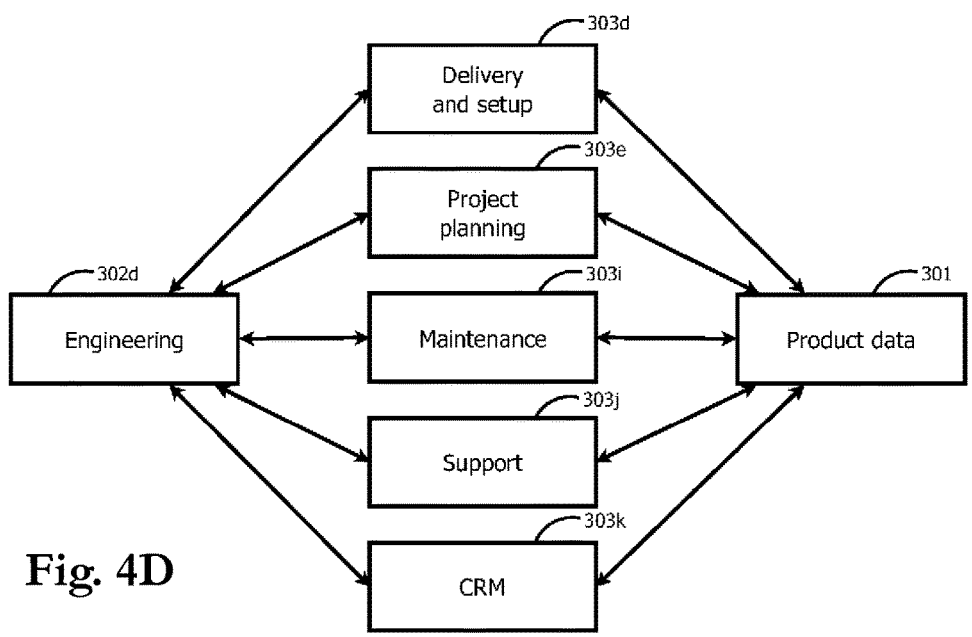

FIG. 4d illustrates an exemplary interaction between the engineering department 302d and various business processes including, e.g, at least one of the delivery and setup process 303d, project planning process 303e, maintenance process 303i, support process 303j, or CRM process 303k. The engineering department 302d can implement the setup part of the delivery and setup process 303d at the site of the customer 206 by implementing any installation and configuration services needed for the goods and services provided by the service provider 201 to the customer 206. The engineering department 302d can use the project planning process 303e as a source of information on the selection and timing of tasks that are required in order to implement the overall project plan. The engineering department 302d can implement the maintenance process 303i at the site of the customer 206 by implementing the periodic work agreed to by the service provider 201 and the customer 206. The engineering department 302d can use the support process to understand and diagnose problems encountered by customers 206, and to implement and track the solutions to those problems. The engineering department 302d can use the CRM process 303k to contact a customer 206. In some or all of these interactions, the product data 301 can serve as the basis of interaction between the business processes 303, and can also serve as a common way for the engineering department 302d to understand their interactions with those business processes.

Figure 4E:
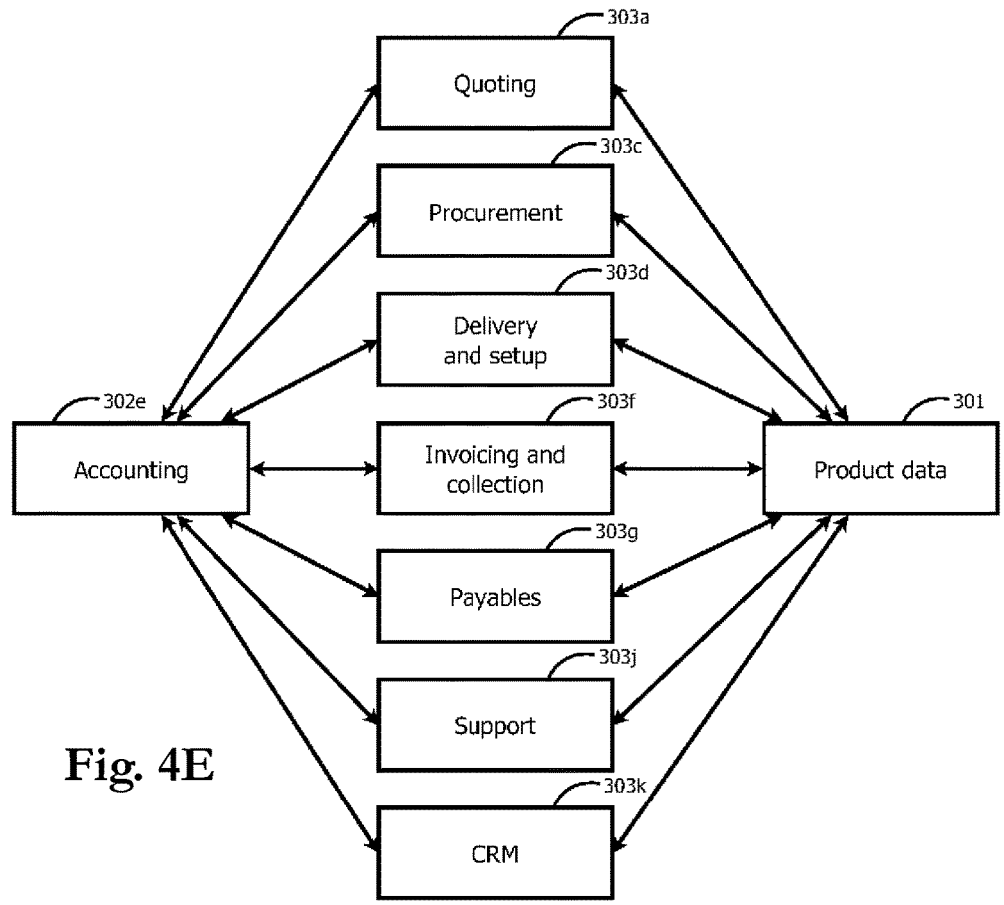

FIG. 4e illustrates an exemplary interaction between the accounting department 302e and various business processes including, e.g., at least one of the quoting process 303a, procurement process 303c, delivery and setup process 303d, invoicing and collection process 303f, payables process 303g, support process 303j, or CRM process 303k. The accounting department 302e can use the quoting process 303a as a source of information for creating an invoice to bill the customer 206. The accounting department 302e can use information from the procurement process 303c to generate forecasts of expenses to manage the cash flow of the service provider 201. The accounting department 302e can use the delivery and setup process 303d to know when deliveries take place at customers 206 in order to coordinate invoices and avoid invoicing a customer 206 for something that has not yet been delivered. The accounting department 302e can manage the invoicing and collection process 303f to deliver invoices to customers 206 and collect payments from them, and can manage the cash flow of the service provider 201. The accounting department 302e can manage the payables process 303g to pay vendors 205 in a timely manner, and can manage the cash flow of the service provider 201. The accounting department 302e can use the support process 303j to manage and track billing and invoicing issues generated by customers 206. The accounting department 302e can use the CRM process 303k to contact a customer 206. In some or all of these interactions, the product data 301 can serve as the basis of interaction between the business processes 303, and can also serve as a common way for the accounting department 302e to understand their interactions with those business processes.

Figure 4F:
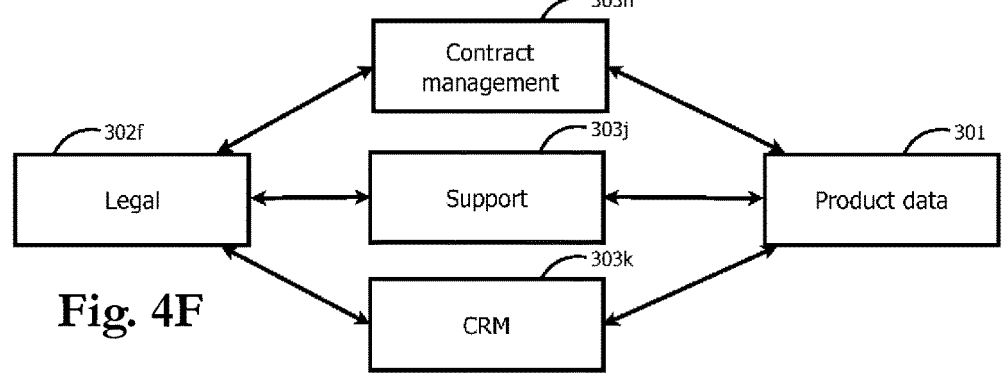

FIG. 4f illustrates an exemplary interaction between the legal department 302f and various business processes including, e.g., at least one of the contract management process 303h, support process 303j, or CRM process 303k. The legal department 302f can manage the contract management process 303h to define and negotiate the terms of any agreement into which the service provider 201 enters. The legal department can use the support process 303j to manage and track any issues generated by customers 206 that involve the terms of an agreement. The legal department 302f can use the CRM process 303k to contact a customer 206. In some or all of these interactions, the product data 301 can serve as the basis of interaction between the business processes 303, and can also serve as a common way for the legal department 302f to understand their interactions with those business processes.

Figure 4G:
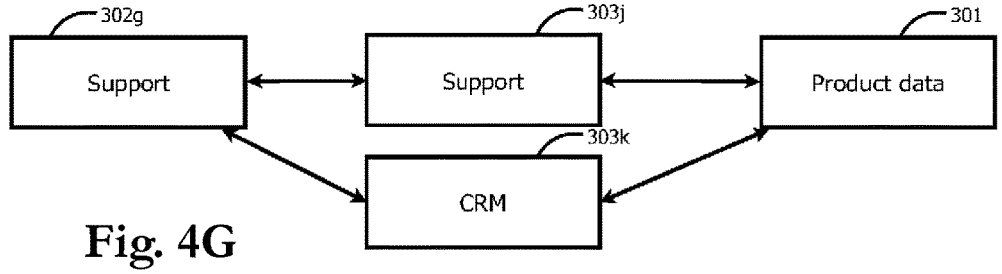

FIG. 4g illustrates an exemplary interaction between the support department 302g and various business processes including, e.g., at least one of the support process 303j or CRM process 303k. The support department 302g can manage the support process 303j and can use it to track and respond to all issues with customers 206. The support department 302g can use the CRM process 303k to contact a customer 206. In some or all of these interactions, the product data 301 can serve as the basis of interaction between the business processes 303, and can also serve as a common way for the support department 302g to understand their interactions with those business processes.

Figure 4H:
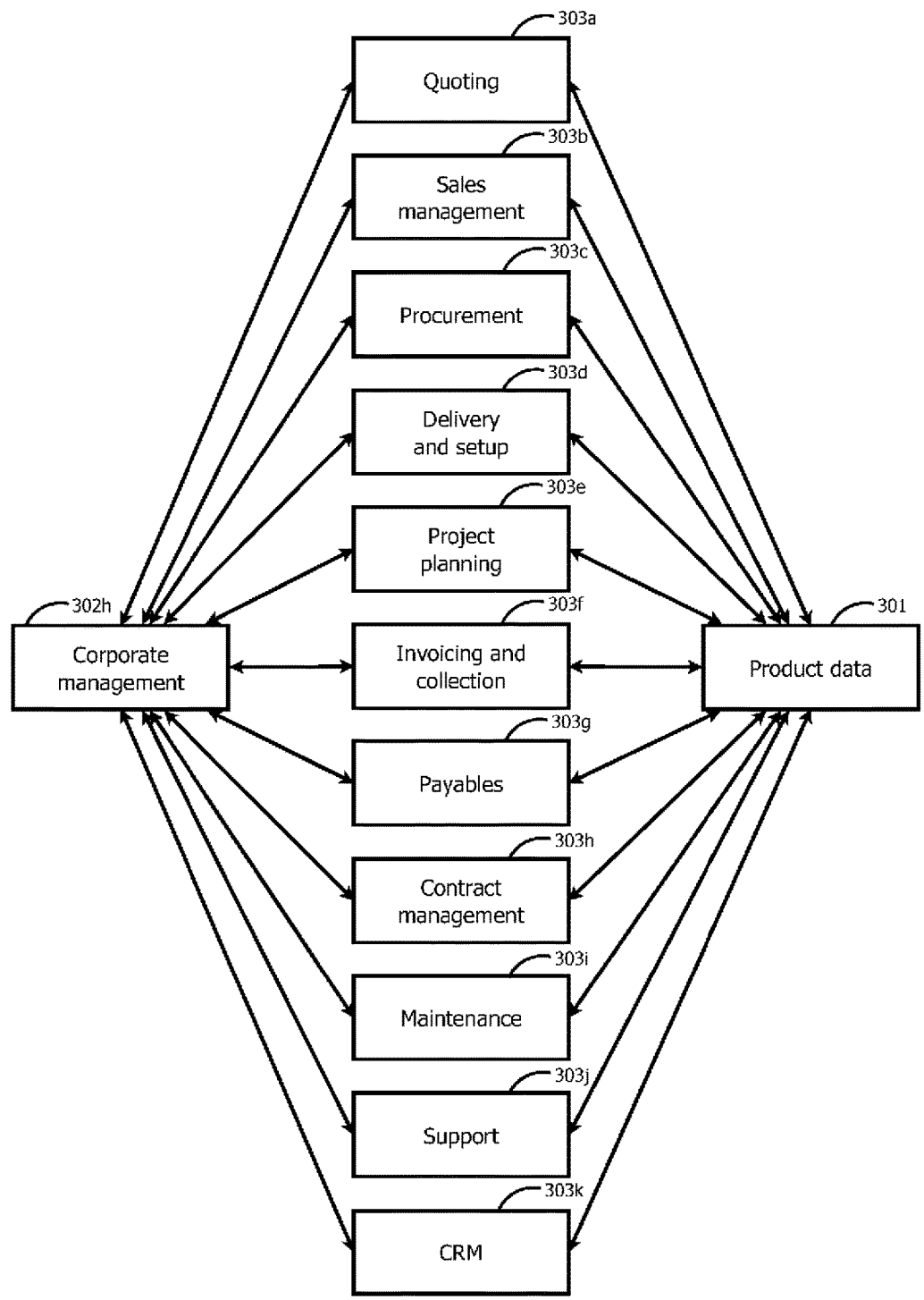

FIG. 4h illustrates an exemplary interaction between corporate management 302h and various business processes including, e.g., at least one of the business processes 303a-303k. Corporate management 302h can use information from business processes 303a-303k to track and understand the operation of the business of the service provider 201 as a whole. This can give a "360-degree view" of the business and can be valuable in making decisions about how to run the business. Again, the product data 301 can serve as the basis of interaction between the business processes 303, which can facilitate oversight provided by corporate management 302h with respect to the status of processes 303 and to understand the implications of same.

Figure 5:
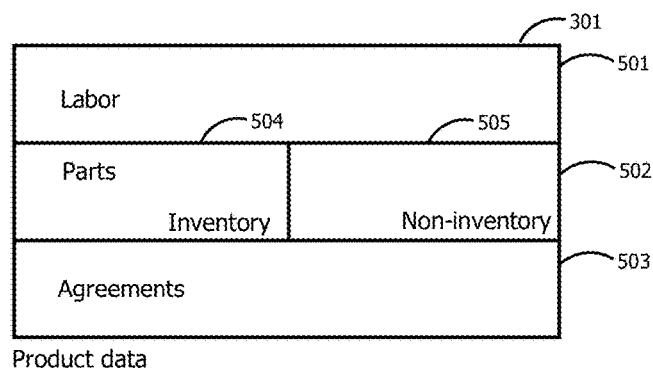
FIG. 5 is an illustrative block diagram of an embodiment of product data.

FIG. 5 illustrates a block diagram of product data 301. In this example, there are three different classes of product data 301. For example, one class of product data 301 can be labor 501, which describes products that are services. Services-oriented products can include one-time actions that are taken by a person. For example, labor 501 can include the action of setting up the initial configuration for a piece of equipment. Another example of labor 501 can include the action of installing a software update onto a computer. Yet another example of labor 501 can include the action of replacing a part in a network router that is broken in order to restore its function. Labor products 501 can be invoiced at a fixed rate, based on the work that is done, or at an hourly rate, based on the amount of time spent doing the work.

A second class of product data 301 is parts 502, which describes products that are purchased entities delivered to the customer 206. For example, parts 502 can include a new piece of equipment that is installed for the customer 206. Another example of parts 502 can include a replacement part for a network router that is broken. In some embodiments, parts 502 can also include non-physical entities such as a software license for a commercial third party software application that is installed for the customer 206. In another example, parts 502 can include an extended warranty from a manufacturer covering repair and updates for a longer period of time than the standard warranty. Parts products 502 can be invoiced at the cost to the service provider 201 plus a markup.

In some embodiments, parts products can include a plurality of subclasses. For example, parts products can include two sub-classes, inventory parts 504 and non-inventory parts 505. Inventory parts 504 can be parts 502 that the service provider 201 orders ahead of time and keeps in stock, which can make it convenient and quick to deliver the inventory parts 505 to a customer 206. Non-inventory parts 505 can be parts 502 that the service provider orders from a vendor 205 on an as-needed basis. The vendor 205 can delivers the parts 502 directly to the customer 206. The vendor 205 can also deliver the parts 502 to the service provider 201, who can then deliver them to the customer 206. Inventory parts 504 can be invoiced with a larger markup than non-inventory parts 505, because the service provider may need to pay the inventory and carrying costs associated with the inventory parts 504.

In some embodiments, product data 301 can include a third class for agreements 503, which describes products that are repeated or periodic services. Repeated or periodic services can refer to actions taken by a person on a regular basis, and can be covered by service agreements that are entered into between the service provider 201 and the customer 206. Examples of agreements 503 can include agreements to periodically clean a piece of equipment at the site of the customer 206; install updates for a commercial third party software application as they are released; and provide a network routing solution to meet a written specification, and continually update the network to meet the written specification as the environment changes. Agreements products 503 are can be invoiced at a fixed fee for a given time period, such as monthly or yearly.

Figure 6:
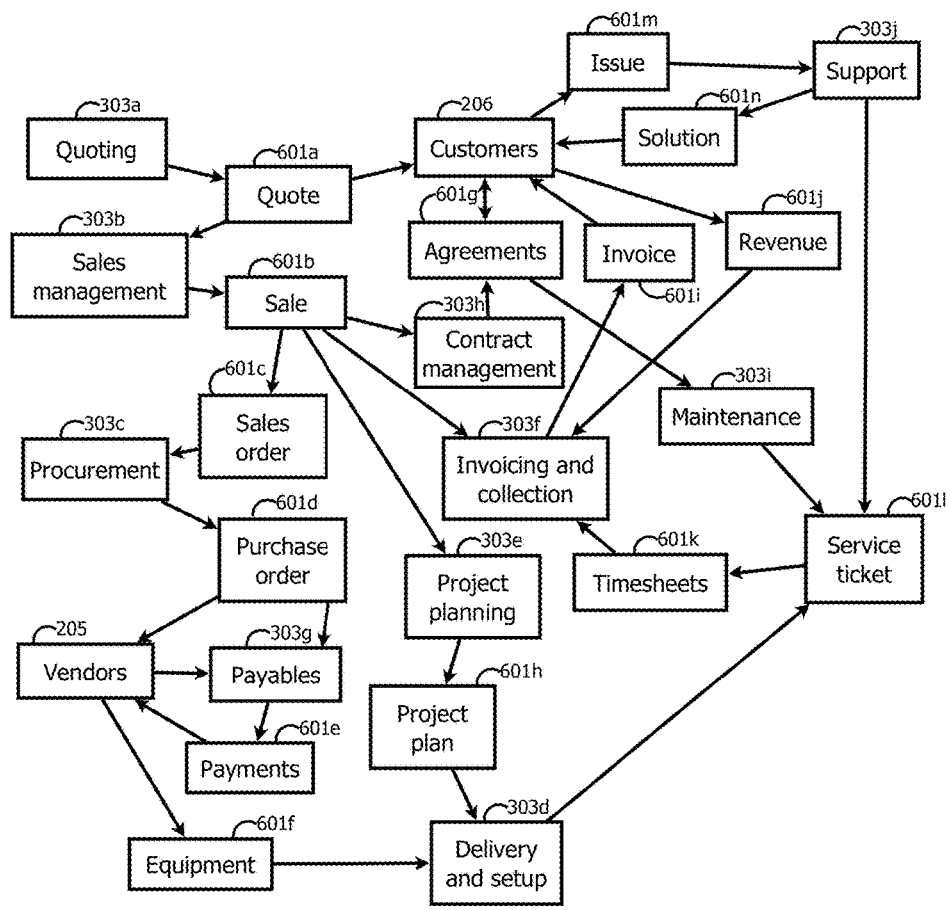
FIG. 6 is an illustrative block diagram of an embodiment of the data flow within a service provider.

FIG. 6 illustrates a block diagram of using the product data 301 to unify communications between the various business processes 303. FIG. 6 illustrates a number of different forms of intermediate data 601 between the business processes 301, but in every case the intermediate data 601 is made up of products from the product data 301, as will be described in further detail here. In this way, the product data 301 serves as a common source of information for both the business processes 301 and the intermediate data 601 that is used to transfer information between them. FIG. 6 is not intended to be limiting, but is instead intended to illustrate many of the aspects of the flow of information inside a service provider 201. Other embodiments of a service provider 201 have elements of data flow that are not shown in FIG. 6.

In some embodiments, the marketing/sales department 302a can commence the process by using the quoting business process 303a to create a quote 601a from the product data 301. In other embodiments, different departments or processes can commence the flow. The quote 601a can include a list of products designed to address the needs of a customer 206. This list can include a plurality of classes of products such as labor products 501, parts products 502, and agreements products 503. For example, a customer 206 that needs an email server may get a quote 601a that includes the hardware for the server, which is a parts product 502, the one-time setup for that server, which is a labor product 501, and the ongoing maintenance for that server, which is an agreements product 503. The quote 601a includes prices for all of the products in the list, so that the customer 206 knows in advance the total price for what is being bought, and exactly what that price includes.

The sales management business process 303b now has the responsibility of selling the products to the customer 206. The marketing/sales department follows a series of steps for working with the customer 206. The steps can reference the list of products in the quote 601a. In some embodiments, the sale is complete when the customer 206 agrees with every element of the quote 601a. At that time, the sale has been closed and the quote 601a is converted to a sale 601b. The sale 601b is a different form of information, but it is a list of the products that the customer 206 has agreed to purchase, so it is created from the quote by using the same product data 301 that the quote refers to. This is an example of how the product data 301 serves as a common source of information for both the quoting business process 303a and the sales management business process 303b.

Once the sale 601b is finalized, the list of products in it is copied, transferred, or otherwise conveyed to several places. For example, the list of parts products 501 in the sale 601b can be copied to a sales order 601c. The sales order 601c is a list of the parts products 501 that need to be ordered in order to deliver the quote 601a. The sales order goes to the procurement business process 303c, which is responsible for procuring the parts products 501 that are listed in the sales order. Since the sales order 601c is created from a list of products from the product data 301, this is an example of how the product data 301 serves as a common source of information for both the sales management business process 303b and the procurement business process 303c.

The list of agreements products in the sale 601b is used by the contract management business process 303h. Each agreements product in the sale 601b is used to generate an agreement 601g. The agreement is created from information in the product data 301 about the product in the list of products in the sale 601b, so this is an example of how the product data 301 serves as a common source of information for both the sales management business process 303b and the contract management business process 303h. The contract management business process 303h is responsible for negotiating the terms of the agreements 601g with the customer 206, and updating the agreements 601g with the results of the negotiation.

The list of all products in the sale 601b is used by the invoicing and collection business process 303f. Each product in the sale 601b is copied into the invoicing system, which is used to create invoices 601i to be sent to the customer 206. The invoices 601i are created from information such as pricing in the product data 301 for the list of products in the sale 601*b*, so this is an example of how the product data 301 serves as a common source of information for both the sales management business process 303*b* and the invoicing and collections business process 303*f*. The invoices 601*i* are not actually sent to the customer 206 until the products listed on them have actually been delivered; this is described later more fully.

The list of labor products 501 in the sale 601*b* is used by the project planning business process 303*e*. The project planning business process 303*e* creates a project plan 601*h*, which is a list of tasks needed to deliver the quote 601*a*. Each labor product 501 listed in the sale 601*b* is copied into one task, and the product data 301 provides information such as the expected length of time for the task. The project planning business process 303*e* assigns the tasks to appropriate staff 202 within the service provider 201 based on the nature of the tasks, and schedules the tasks based on the availability of the staff 202. The result is the completed project plan 601*h*. The tasks in the project plan 601*h* are created using information from the product data 301 about the labor products 501 in the sale 601*b*, so this is an example of how the product data 301 serves as a common source of information for both the sales management business process 303*b* and the project planning business process 303*e*.

The list of products in the sales order 601*c* is used by the procurement business process 303*c* to create purchase orders 601*d*. A purchase order 601*d* is a list of products to be procured from one vendor 205. Each product in the sales order 601*c* that is procured from the same vendor 205 is copied into the purchase order 601*d* for that vendor 205. The purchase order 601*d* is then sent to the vendor 205 and is also used by the payables business process 303*g*. The purchase orders 601*d* are created using the vendor information in the product data 301, so this is an example of how the product data 301 serves as a common source of information for both the procurement business process 303*c* and the payables business process 303*g*.

The list of products in the purchase order 601*d* is used by the payables business process 303*g* to create payments 601*e* to be sent to the vendors 205. The payables business process 303*g* monitors the deliveries of equipment 601*f* from the vendors 205 and coordinates the payments 601*e* to correspond to the delivery times and terms agreed upon with the vendors 205. The payments 601*e* are created and scheduled using vendor information and payment terms in the product data 301, so this is another example of how the product data 301 serves as a common source of information for both the procurement business process 303*c* and the payables business process 303*g*.

The project plan 601*h* is used by the delivery and setup business process 303*d* to schedule the delivery of equipment 601*f* to the customer 206 as well as the use of staff 202 to set up the equipment 601*f* once it has been delivered. Each task in the project plan 601*h* is copied into a service ticket 601*l*, and the service tickets are used by the staff 202 to properly organize their time so that the setup of the equipment 601*f* is done in a timely and efficient manner. The service tickets 601*l* are created using information about the time and expense taken from the product data 301 for the labor products 501 in the tasks in the project plan 601*h*, so this is an example of how the product data 301 serves as a common source of information for both the project planning business process 303*e* and the delivery and setup business process 303*d*.

The staff 202 addressing the service tickets 601*l* creates timesheets 601*k* for the work they are doing. Information from the service ticket 601*l* that is completed is copied into the timesheet entry for that ticket, and the timesheet goes to the invoicing and billing business process to be included in the invoice 601*l* that is sent to the customer 206. This closes the loop that was described previously where a labor product 501 entered the invoicing and collection business process 303*f* from the sale 601*b*; the arrival of the same labor product 501 from a timesheet 601*k* indicates that the labor product 501 has been delivered to the customer and can now be included in an invoice 601*l* that is sent to the customer. Since the same labor product 501 is used from the product data 301, this is an example of how the product data 301 serves as a common source of information for the sales management business process 303*b*, the invoicing and collection business process 303*f*, and the delivery and setup business process 303*d*.

The agreements 601*g* are used by the maintenance business process 303*i* to schedule and deliver the ongoing tasks required to meet the terms of the agreements 601*g*. The terms of the agreements 601*g* in the products in the agreements are copied into service tickets 601*l*, and the service tickets are used by the staff 202 to properly organize their time so that the periodic maintenance tasks are done in a timely and efficient manner. The service tickets 601*l* are created using information about the scheduling, time, and expense taken from the product data 301 for the agreements products 503 in the agreements 601*g*, so this is an example of how the product data 301 serves as a common source of information for both the contract management business process 303*h* and the maintenance business process 303*i*.

The service tickets 601*l* created by the maintenance business process 303*i* can be handled in essentially the same way as previously described for service tickets 601*l* created by the delivery and setup business process 303*d*. In much the same way, this is an example of how the product data 301 serves as a common source of information for the sales management business process 303*b*, the invoicing and collection business process 303*f*, and the maintenance business process 303*i*.

The customers 206 have ongoing issues 601*m* with the goods and services delivered by the service provider 201. The support business process 303*j* takes these issues 601*m* in a triage process and creates a service ticket 601*l* for each ticket. Since each issue is in reference to a particular product, the support process copies information from the product data 301 into the service ticket 601*l*. The service tickets are then used by staff 202 to prioritize and organize time and effort efficiently to arrive at solutions 601*n* for the issues, which are delivered to the customers 206. The product information in the service tickets 601*l* is integral in understanding, diagnosing, and solving the issues 601*m*, so this is an example of how the product data 301 serves as a common source of information for the support business process 303*j* and every other business process 301, since any other business process 301 can be involved in solving customer issues 601*m* at some point in time.

The service tickets 601*i* created by the support business process 303*j* are handled in essentially the same way as previously described for service tickets 601*l* created by the delivery and setup business process 303*d*. In much the same way, this is an example of how the product data 301 serves as a common source of information for the sales management business process 303*b*, the invoicing and collection business process 303*f*, and the support business process 303*j*.

The logical end of the overall flow is reached when the customer 206 delivers revenue 601*j* to the service provider 201 in response to receiving an invoice 601*i*. The revenue 601i goes to the invoicing and collection business process 303f, which matches the revenue against the invoices 601i that have been delivered to the customer 206 and closes the outstanding billing. In this final step, the revenue 601j can be matched to the product items in the invoice 601i that is being paid, so this is an example of how the product data 301 serves as a common source of information for the invoicing and collection business process 303f to manage the financial relationship with the customer 206.

Figure 7A:
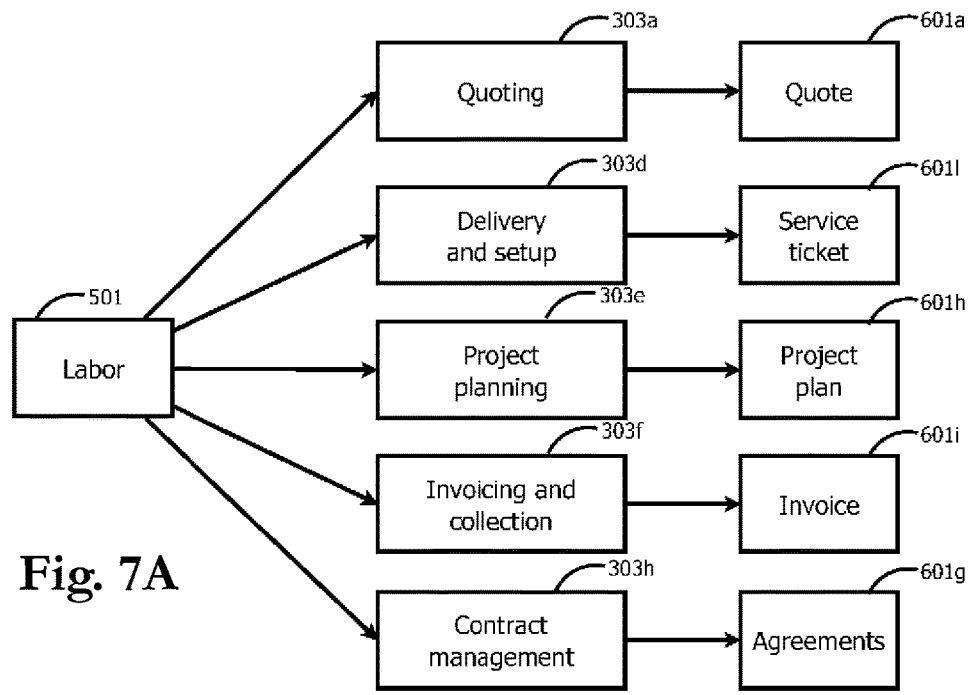
FIGS. 7A-C are illustrative block diagrams of embodiments of the flow of information from product data to the business processes within a service provider.
Figure 7B:
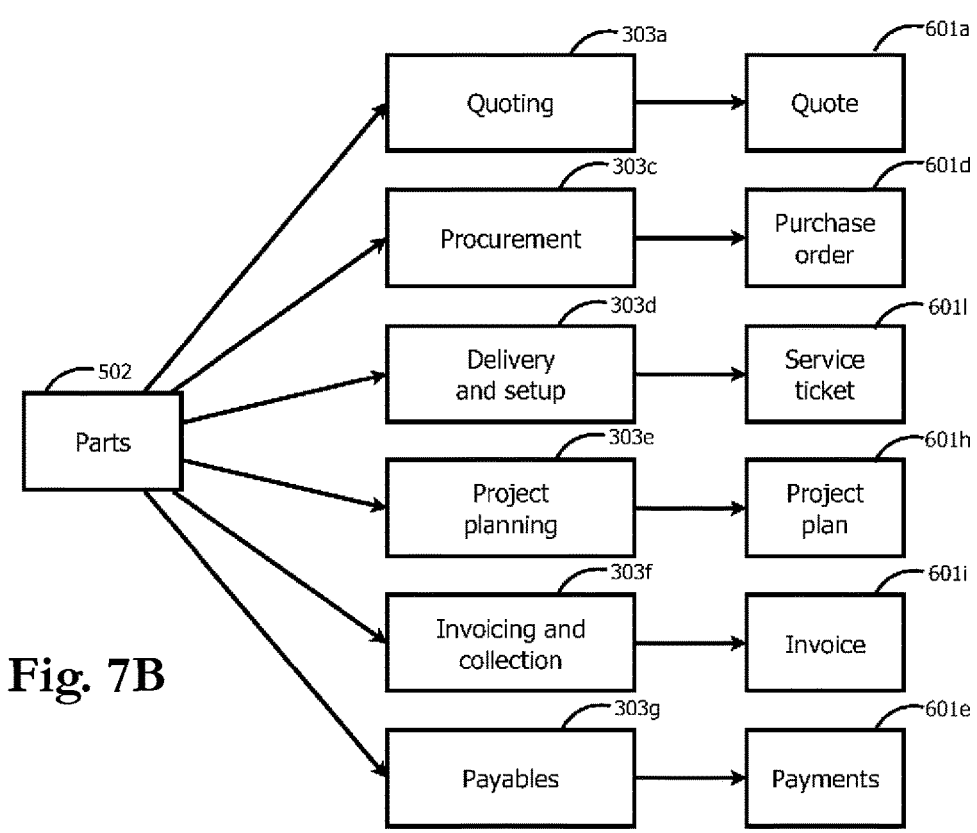
Figure 7C:
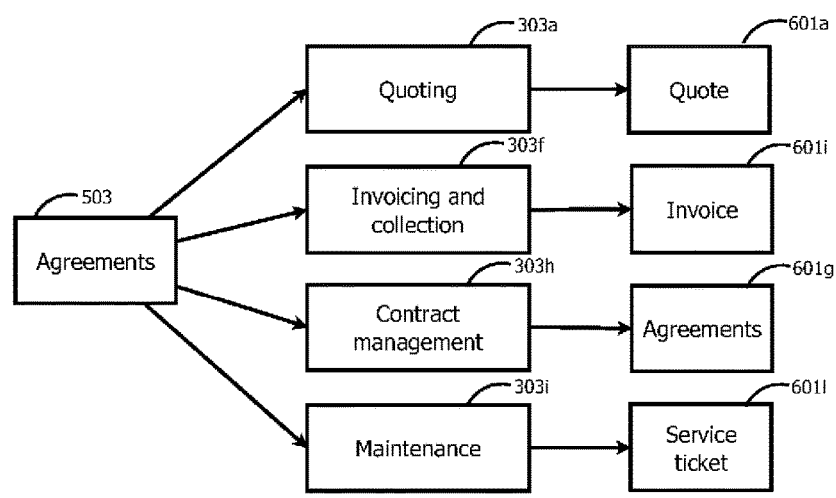

FIG. 7 illustrates a block diagram of the way in which the product class affects how information from the product data 301 is copied to the business processes 303 in the system. The product class is the entity that divides the product data 301 into labor products 501, which are detailed in FIG. 7a, parts products 502, which are detailed in FIG. 7b, and agreements products 503, which are detailed in FIG. 7c.

FIG. 7a illustrates the way in which information from labor products 501 is copied to the business processes 303 in the system. In particular, information from labor products 501 is copied to the quoting business process 303a, delivery and setup business process 303d, project planning business process 303e, invoicing and collection business process 303f, and contract management business process 303h.

The quoting business process 303a creates a quote 601a in which every line item is a product from the product data 301. The line item uses information from the labor product data 501 to fill in, among other things, the description, part number, hourly rate, fixed fee, technician skill level, estimated time, and arbitrary notes for the product.

The delivery and setup business process 303d creates service tickets 601l for each task that is required in order to complete the delivery and setup. Each service ticket uses information from the labor product data 501 to fill in, among other things, the description, estimated time, customer name, customer contact information, and arbitrary notes for the ticket.

The project planning business process 303e creates a project plan 601h in which every task corresponds to a product from the product data 301. The task uses information from the labor product data 501 to fill in, among other things, the description, budgeted time, billing type, resource type (skill level) required, and arbitrary notes for the task.

The invoicing and collection business process 303f creates an invoice 601i in which every line item is a product from the product data 301. The line item uses information from the labor product 501 to fill in, among other things, the description, part number, hourly rate, fixed fee, billing method, and arbitrary notes for the product.

The contract management business process 303h creates agreements 601g when a labor product 501 is delivered by an outside vendor 205 rather than a staff member 202 of the service provider 201. In this case, the contract management must set up an agreement 601g with the vendor 205 specifying the terms for the delivery of the labor product 501. The agreement 601g uses information from the labor product 501 to fill in, among other things, the name, description, hourly rate, fixed fee, billing method, estimated time, vendor name, and arbitrary notes for the product.

FIG. 7b illustrates the way in which information from parts products 502 is copied to the business processes 303 in the system. In particular, information from parts products 502 is copied to the quoting business process 303a, procurement business process 303c, delivery and setup business process 303d, project planning business process 303e, invoicing and collection business process 303f, and payables business process 303g.

The quoting business process 303a creates a quote 601a in which every line item is a product from the product data 301. The line item uses information from the parts product data 502 to fill in, among other things, the description, part number, packaging, price, pricing modifiers, image, arbitrary notes, and sourcing information for the product.

The procurement business process 303c creates a purchase order 601d in which every line item is a product from the product data 301. The line item uses information from the parts product data 502 to fill in, among other things, the product ID, description, quantity, price, customer site, packaging, pricing modifiers, and arbitrary notes for the product.

The delivery and setup business process 303d creates service tickets 601i for each task that is required in order to install and configure the parts product 502. Each service ticket uses information from the parts product data 502 to fill in, among other things, the description, estimated time, customer name, customer contact information, and arbitrary notes for the ticket.

The project planning business process 303e creates a project plan 601h in which every task corresponds to a product from the product data 301. The tasks corresponding to parts product data 502 are the tasks for installing and configuring those parts products 502. The tasks use information from the parts product data 502 to fill in, among other things, the description, budgeted time, billing type, resource type (skill level) required, and arbitrary notes for the task.

The invoicing and collection business process 303f creates an invoice 601i in which every line item is a product from the product data 301. The line item uses information from the parts product 501 to fill in, among other things, the description, part number, packaging, price, pricing modifiers, image, arbitrary notes, and sourcing information for the product.

The payables business process 303g creates payments 601e for products that are ordered from vendors 205. The payments correspond to a series of parts products, and the payments use information from the parts product data 502 to fill in, among other things, the description, price, part number, and arbitrary notes for the product.

FIG. 7c illustrates the way in which information from agreements products 503 is copied to the business processes 303 in the system. In particular, information from agreements products 503 is copied to the quoting business process 303a, invoicing and collection business process 303f, contract management business process 303h, and maintenance business process 303i.

The quoting business process 303a creates a quote 601a in which every line item is a product from the product data 301. The line item uses information from the agreements product data 503 to fill in, among other things, the name, description, hourly rate, fixed fee, billing method, estimated time, vendor name, and arbitrary notes for the product.

The invoicing and collection business process 303f creates an invoice 601i in which every line item is a product from the product data 301. The line item uses information from the agreements product 503 to fill in, among other things, the name, description, hourly rate, fixed fee, billing method, estimated time, vendor name, and arbitrary notes for the product.

The contract management business process 303h creates agreements 601g to fulfill the obligations required by the agreements products 503. The contract management sets up an agreement 601g with the customer 206 specifying the terms for the delivery of the agreements product 503. The agreement 601g uses information from the labor product 501 to fill in, among other things, the name, description, hourly rate, fixed fee, billing method, estimated time, vendor name, and arbitrary notes for the product.

The maintenance business process 303d creates service tickets 601l for each task that is required in order to complete the periodic maintenance task. Each service ticket uses information from the agreement product data 503 to fill in, among other things, the description, hourly rate, fixed fee, billing method, estimated time, scheduling information, customer name, customer contact information, and arbitrary notes for the ticket.

Figure 8:
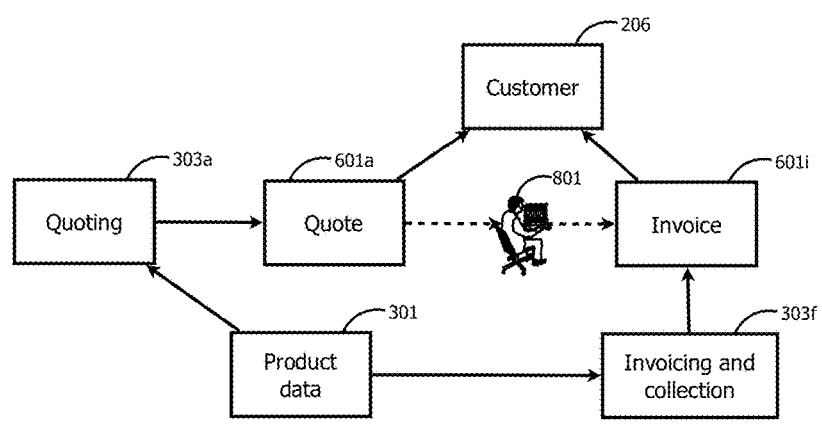
FIG. 8 is an illustrative block diagram of an embodiment of reliable synchronization of the quote and invoice seen by a customer.

FIG. 8 illustrates a block diagram of reliable synchronization of the quote 601a and invoice 601i seen by the customer 206. After the quoting business process 303a prepares the quote 601a, the quote 601a is sent to the customer 206. The customer may interact with the quote 601a and may even change it. After this, many business processes 303 interact with the quote 601a and are driven by it. Eventually, sometimes much later, one end result of the sale is the invoicing and collection business process 303f, which prepares the invoice 601i to be sent to the customer 206. This is a very important process to the service provider 201, because it is the mechanism by which the business makes money. In some systems not described by the present disclosure, the invoice 601i is created by a person 801 using a manual process that involves referring to the quote 601a. Preparing the invoice 601i this way has a substantial risk of introducing errors, including simple typographical errors, transcription errors, referring to the wrong copy of a quote, and so on. Unfortunately, the consequences of a customer 206 seeing a mismatch between the quote 601a and the invoice 601i are very negative. The customer 206 is not sure what amount to pay, which delays the payment. The customer 206 may interpret the mismatch as hidden charges or over-billing. The customer is likely to lose faith in the service provider 201 as a result of this relatively minor error.

The present disclosure completely avoids the unfortunate situation described. Since both the quote 601a and the invoice 601i are derived from the same list of products from the product data 301, and the same product list is used by both the quoting process 303a and the invoicing and collection process 601i, the quote 601a and the invoice 601i seen by the customer 206 always match exactly. In this way, the customer knows well in advance what payment is expected, so the payment is handled smoothly. The customer feels that the service provider 201 is in control and professional.

Figure 9:
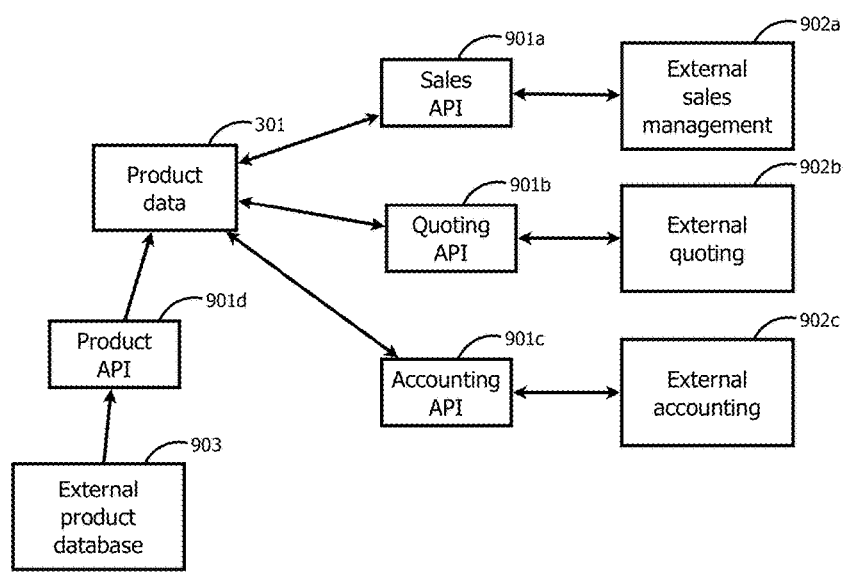
FIG. 9 is an illustrative block diagram of an embodiment of interfaces between product data and external systems.

FIG. 9 illustrates a block diagram of interfaces between product data 301 and external systems 902-903. The service provider 201 may use external systems for some business processes. For example, the service provider 201 may use an external system when the service provider 201 previously chose a system for one business process long before deciding to use a resource planning system 204, and does not want to train employees to work with a different system. In another embodiment, the service provider 201 previously chose or can choose a system for one or more business process based on special needs that require the features of that system. In another embodiment, the service provider 201 previously chose or can choose a system for one business process based on requirements imposed by a customer 206 or a vendor 205. FIG. 9 illustrates an embodiment where the sales management process is implemented using an external sales management system 902a such as the system provided by Salesforce.com of San Francisco, Calif., USA. FIG. 9 illustrates an embodiment where the quoting process is implemented using an external quoting system 902b such as the system provided by Quosal LLC of Bothell, Wash., USA. FIG. 9 illustrates an embodiment where the invoicing and collection process and the payables process is implemented using an external accounting system 902c such as the QuickBooks system provided by Intuit, Inc. of Mountain View, Calif., USA. For each of these external systems, the resource planning system 204 provides an application programming interface (API) 901 that communicates information both ways between the product data 301 and the external system 902. The API 901 uses a well defined interface defined by the supplier of the external system 902, and is greatly simplified by the fact that it only needs to correctly interface to a single product data source 301 in order to work with the rest of the resource planning system 204. In this way, a sales API 901a is provided to interface the product data 301 with the external sales management system 902a, a quoting API 901b is provided to interface the product data 301 with the external quoting system 902b, and an accounting API 901c is provided to interface the product data 301 with the external accounting system 902c.

In some embodiments, external interfaces can facilitate the use of external sources of product data. For example, external interfaces can facilitate importing standard product data from an external product database 903, such as the product database provided by Etilize, Inc. of Denver, Colo., USA. The external product database 903 may include thousands of commercially available products. To use this external product database 903, the resource planning system 204 provides a product API 901d that communicates information from the external product database 903 to the product data 301. The API 901d uses a well defined interface defined by the supplier of the external product database 903, and is greatly simplified by the fact that it only needs to correctly interface to a single product data source 301 in order to work with the rest of the resource planning system 204.

Figure 10:
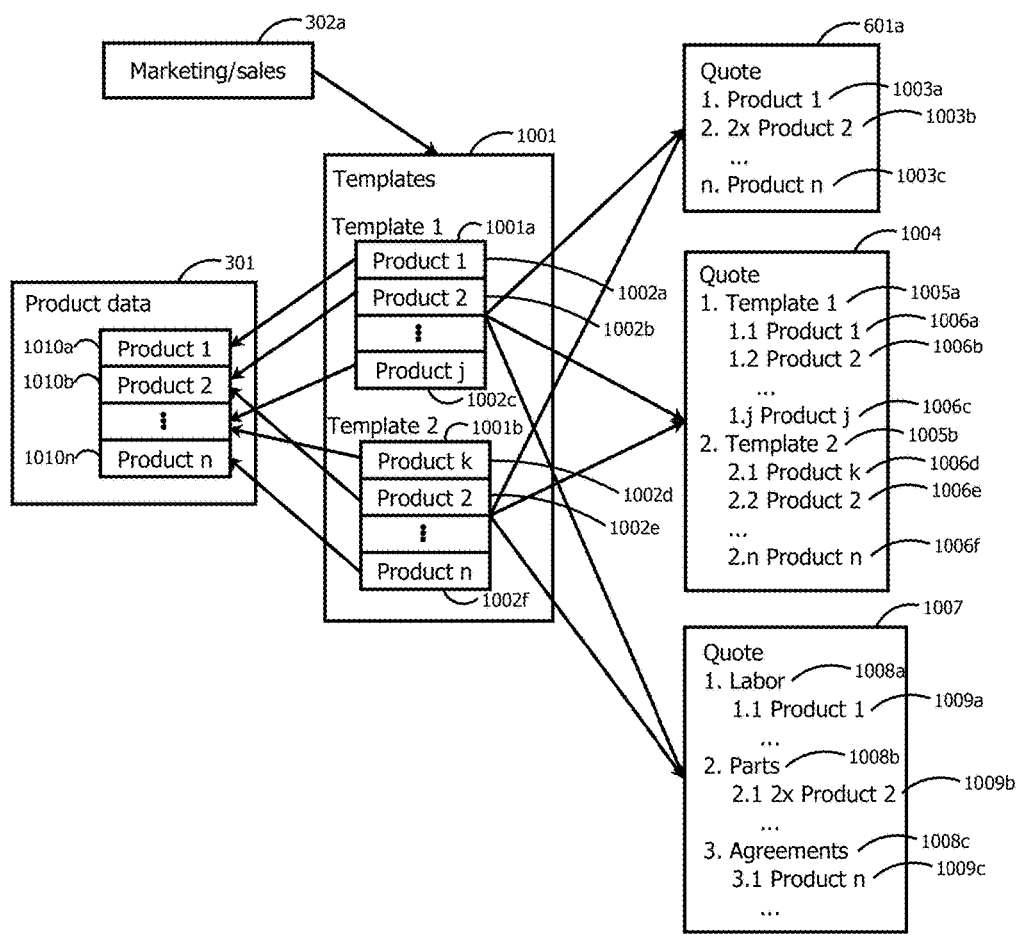
FIG. 10 is an illustrative block diagram of an embodiment of templates for product data.

FIG. 10 illustrates a block diagram of templates 1001 for product data 301. When the marketing/sales department 302a prepares a quote 601a for a customer, there is often a need to add to the quote 601a a collection of products that are commonly grouped together. In one embodiment, a quote for a small business setup includes a server, a router, a firewall/VPN, operating system software for the server, VPN software for the employees of the business, software installation, network installation, and monitoring and maintenance for the server. The service provider 201 wants to ensure that all of these products are included in the quote with the right configuration and pricing, but it is inefficient and error prone to require that all of the sales staff knows this product configuration, especially since it will change from time to time. To address this issue, the resource planning system 204 provides templates 1001 that are used to manage groups of products.

A list of templates 1001 is available for generating quotes 601a. In one embodiment, template 1 1001a contains product references to product 1 1002a through product j 1002c, and template 2 1001b contains product references to product k 1002d through product n 1002f, as well as a reference to product 2 1002e. Each of the product references 1002 in the templates 1001 is a pointer to the actual product information 1010 in the product data 301, so that when the product data 301 is updated, the templates 1001 are automatically updated as well. When template 1 1001a and template 2 1001b are both added to a quote 601a, the quote 601a lists line items 1003 for product 1 1003a through product n 1003c. The line item 1003b for product 2 indicates a quantity of 2, because one was generated by reference 1002b in template 1 1001a, and the other was generated by reference 1002e in template 2 1001b.

Since the quote 601*a* is generated automatically from the product data 301, it is simple for the marketing/sales department to generate the quote in different formats for the convenience of the customer. In one embodiment, the quote 601*a* is organized as a simple list of the products. In a second embodiment, the quote 1004 is organized by the templates 1005 used to make the quote, with the products 1006 listed within the templates. In a third embodiment, the quote 1007 is organized by the product classes labor 1008*a*, parts 1008*b*, and agreements 1008*c*, and the products are listed in each class 1008 as described previously, as labor products 1009*a*, parts products 1009*b*, and agreements products 1009*c*.

In this way, templates 1001 allow the sales/marketing department 302*a* to provide a quote 601*a* to a customer that contains commonly offered combinations of products, without requiring the sales/marketing department 302*a* to have detailed knowledge of the exact combination of products used in those commonly offered combinations.

Figure 11:
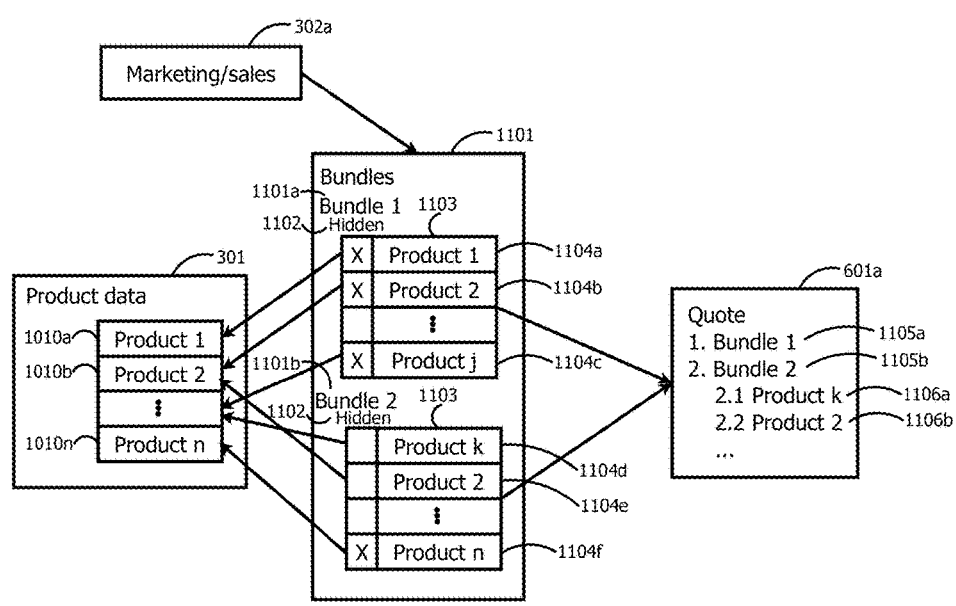
FIG. 11 is an illustrative block diagram of an embodiment of bundles for product data.

FIG. 11 illustrates a block diagram of bundles 1101 for product data 301. When the marketing/sales department 302*a* prepares a quote 601*a* for a customer, it may add to the quote 601*a* a product that is provided by the service provider 201, but is internally divided into a number of components. In one embodiment, the service provider 201 provides a product that is a small business server, but internally the product is made up of the server hardware, the operating system software license, the labor to install and configure the server, and the agreement for maintaining the server. In some embodiments, the resource planning system 204 provides bundles 1101 that are used to manage products that are made up of a number of components. The bundles 1101 can hide details from the customer, simplify the quote to make it more readable, or disguise details of the server hardware to discourage the customer 206 from looking for another source for the hardware.

A list of bundles 1101 is available for generating quotes 601*a*. In one embodiment, bundle 1 1101*a* contains product references to product 1 1104*a* through product j 1104*c*, and bundle 2 1101*b* contains product references to product k 1104*d* through product n 1104*f*, as well as a reference to product 2 1104*e*. Each of the product references 1104 in the bundles 1101 is a pointer to the actual product information 1010 in the product data 301, so that when the product data 301 is updated, the bundles 1101 are automatically updated as well. Each product reference 1104 in a bundle 1101 contains both the product reference itself 1103, and an indicator 1102 as to whether or not the product reference should be hidden. In FIG. 11, all of the product references 1104*a*-1104*c* in bundle 1 1101*a* are hidden, and only the product reference 1104*f* to product n in bundle 2 1101*b* is hidden.

When bundle 1 1101*a* and bundle 2 1101*b* are both added to a quote 601*a*, the quote 601*a* lists one line item 1105*a* for bundle 1, and a line item 1105*b* for bundle 2 that is broken down into line items 1106 for all of the product references 1104 in bundle 2 1101*b* except for product n 1104*f*, which is marked as hidden.

In this way, bundles 1101 allow the service provider 201 to provide its own products that are made up of component products, and also provide the ability to hide the details of those products where it is advantageous for the operation of the business.

In some embodiments, the system can determine to hide one or more details based on a user identifier (e.g., username, biometric information, pin number) associated with a user of the system, such as a customer or other entity using the system. For example, the system may include a list of users that are authorized to view certain data, and compare the user identifier of the user with the list to determine whether the user is authorized to view such data. In some embodiments, the system may prompt the user for a password prior to making the determination. Upon determining that the user is not authorized to view certain data (e.g., price or product details), the system may omit or otherwise censor the data such that the data is effectively hidden from the user. In some embodiments, the user can request access to the hidden data. The system can forward the request to a system manager or operator, who may grant or deny the request.

Figure 12:
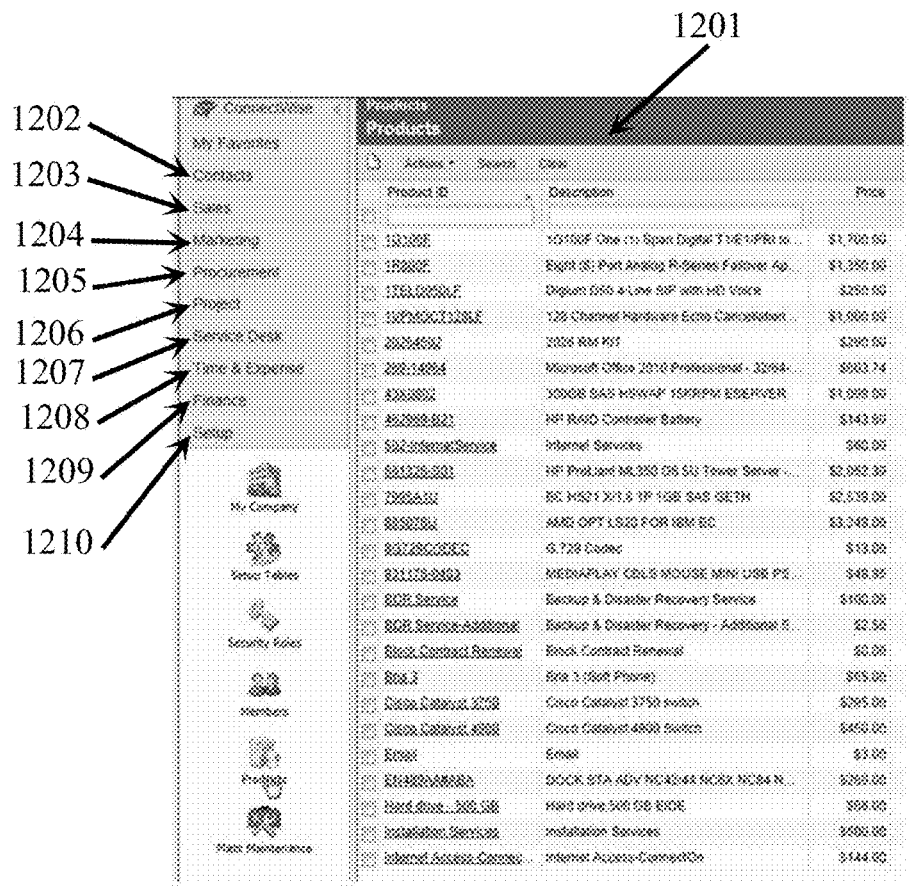
FIG. 12 is an illustrative example of an embodiment of a user interface for overall access to a resource planning system.

FIG. 12 illustrates an embodiment of a user interface, provided by the resource planning system 204, for overall access. The main display 1201 shows a view of the product data 301. The navigation display has tabs to select different main displays for contacts 1202, sales 1203, marketing 1204, procurement 1205, project 1206, service desk 1207, time and expense 1208, finance 1209, and setup 1210.

Figure 13:
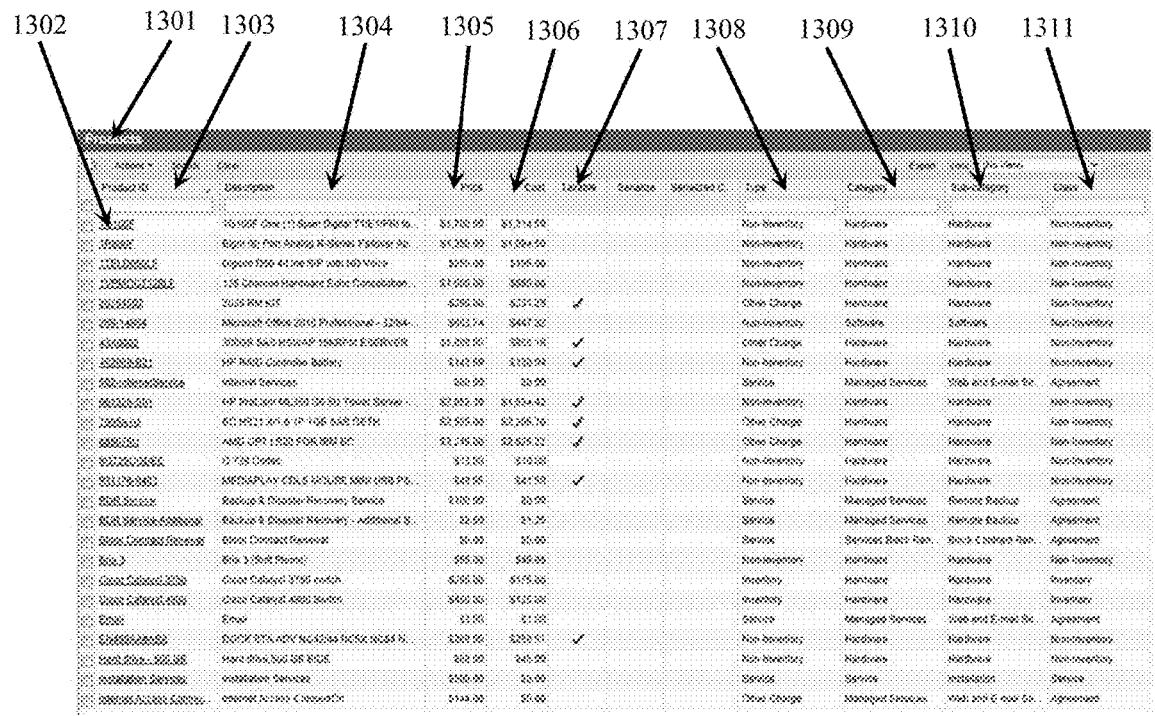
FIG. 13 is an illustrative example of an embodiment of a user interface for displaying and modifying product data.

FIG. 13 illustrates an embodiment of a user interface, provided by the resource planning system 204, for displaying and modifying product data. The display 1301 shows a list of the product data, with a single line for each product 1302. The columns 1303-1311 display information about each product. Column 1303 displays the product ID. Column 1304 displays the description of the product. Column 1305 displays the price of the product to the customer 206. Column 1306 displays the cost of the product from the vendor 205. Column 1307 displays whether or not the product is taxable. Column 1308 displays the type of the product, column 1309 displays the category of the product, and column 1310 displays the sub-category of the product. Together, the type, category, and sub-category of the product displayed by columns 1308-1310 affect the way the product is treated by the rest of the resource planning system 204. Column 1311 displays the class of the product as described previously with respect to FIG. 5.

Figure 14:
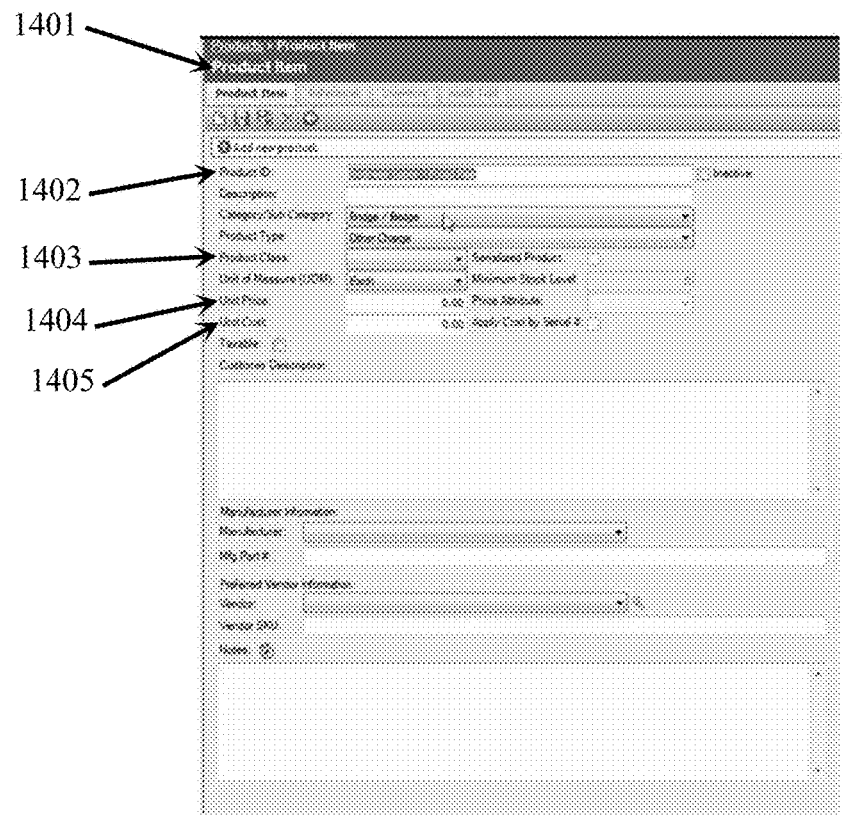
FIG. 14 is an illustrative example of an embodiment of a user interface for displaying and modifying a single item of product data.

FIG. 14 illustrates an embodiment of a user interface, provided by the resource planning system 204, for displaying and modifying a single item of product data. The display 1401 is shown by selecting one of the products 1302 in the display 1301 described previously with respect to FIG. 13. Entry 1402 allows the product ID, which is displayed in column 1303 in FIG. 13, to be modified. Entry 1403 allows the product class, which is displayed in column 1311 in FIG. 13, to be modified. Entry 1404 allows the product price, which is displayed in column 1305 in FIG. 13, to be modified. Entry 1405 allows the product cost, which is displayed in column 1306 in FIG. 13, to be modified.

Figure 15:
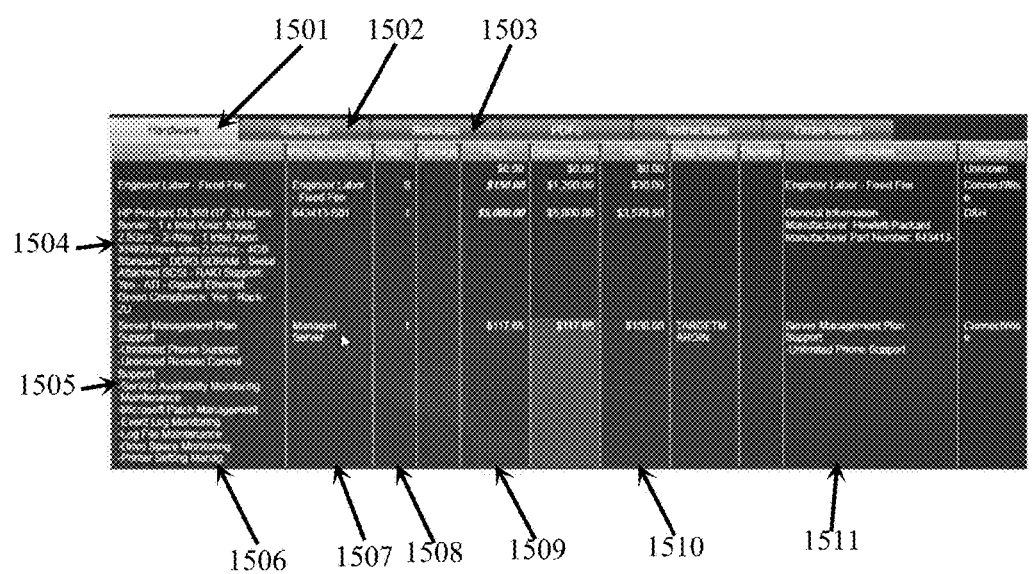
FIG. 15 is an illustrative example of an embodiment of a user interface for displaying and modifying a quote for a customer.

FIG. 15 illustrates an embodiment of a user interface, provided by the resource planning system 204, for displaying and modifying a quote for a customer. The display has tabs across the top allowing selection of different components of the quote. Tab 1501 selects the hardware component of the quote. Tab 1502 selects the software component of the quote. Tab 1503 selects the services component of the quote. When a product is added to the quote, the product type, product category, product sub-category, and product class displayed in columns 1308-1311 of FIG. 13 determine the component of the quote to which the product belongs. Every product that is added to the quote adds a row to the quote. In one embodiment, the quote has two hardware products, which appear in row 1504 and row 1505 in the hardware section 1501 of the quote. Each row has columns 1506-1511 that describe the product in the row. Column 1506 displays the long description of the product. Column 1507 displays the manufacturer's part number for the product. Column 1508 displays the number of products that are in the quote.

Column 1509 displays the unit price of the product, and column 1510 displays the total price for the product in the quote. Column 1511 displays any notes relevant to the product in the quote.

Figure 16:
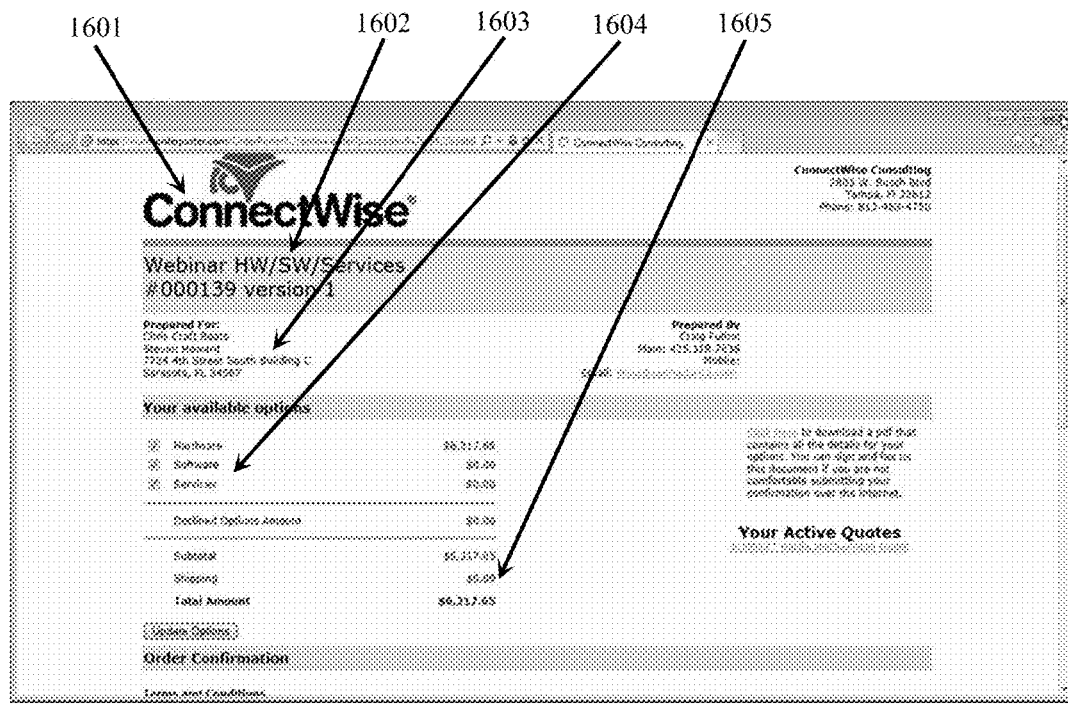
FIG. 16 is an illustrative example of an embodiment of a quote for a customer.

FIG. 16 illustrates an embodiment of a printable quote to be sent to a customer 206. The quote is customized with the name and logo 1601 of the service provider 201. The quote includes a name and other identifying information 1602. The quote includes the customer information 1603. The quote includes summary totals 1604 of the price being quoted for different classes of products. The quote also includes a total price 1605 for easy reference by the customer 206.

Figure 17:
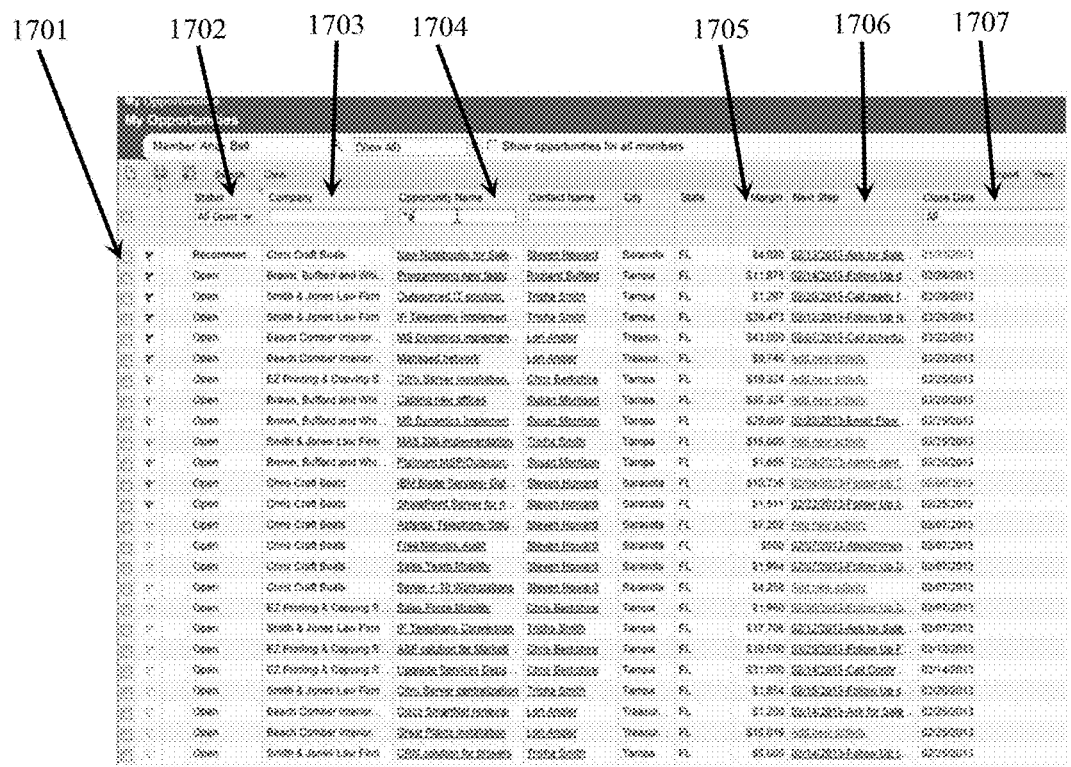
FIG. 17 is an illustrative example of an embodiment of a user interface for sales management.

FIG. 17 illustrates an embodiment of a user interface, provided by the resource planning system 204, for sales management. The display shows all the sales opportunities being pursued, for easy reference by the sales staff. Each sales opportunity is displayed as one row 1701. Each row has multiple columns 1702-1707 that display the data for that sales opportunity. Column 1702 displays the status of the opportunity. Column 1703 displays the company with which the opportunity is being pursued. Column 1704 displays the internal name of the opportunity. Column 1705 displays the margin (profit) that the opportunity would give the service provider 201 if it were closed. Column 1706 displays the next step that is required by the sales staff in order to advance the opportunity. Column 1707 displays the expected closing date for the opportunity, or the actual closing date if the opportunity has been closed.

Figure 18:
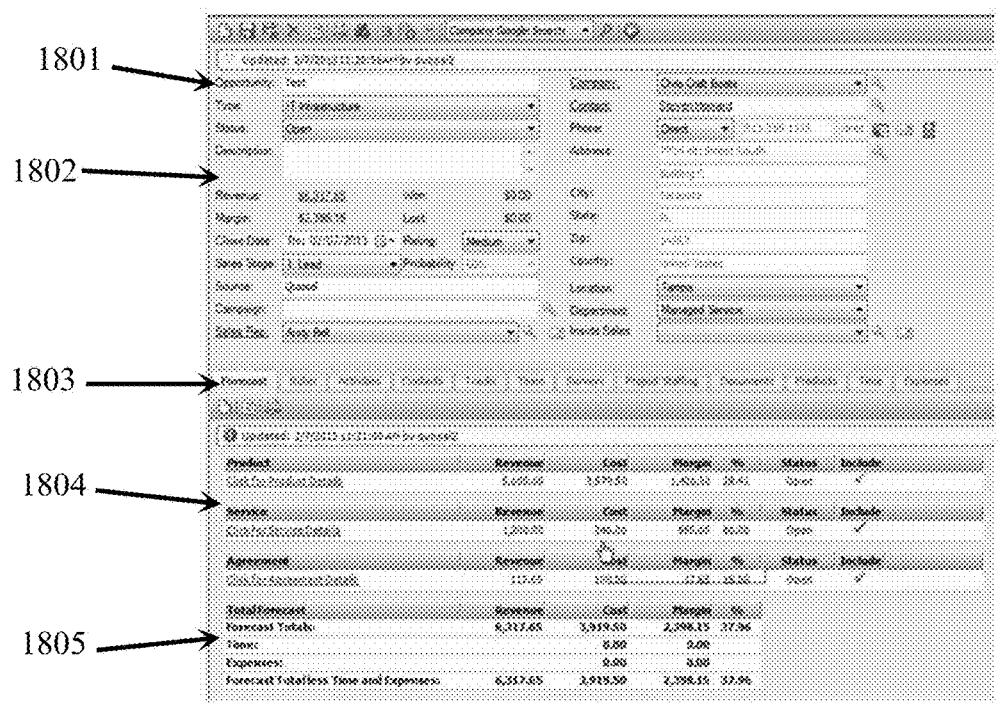
FIG. 18 is an illustrative example of an embodiment of a user interface for managing a single sales opportunity.

FIG. 18 illustrates an embodiment of a user interface, provided by the resource planning system 204, for managing a single sales opportunity. The display allows the sales staff to view and edit all the detail information about a single sales opportunity. Entry 1801 allows the internal name of the opportunity, which is displayed in column 1704 in FIG. 17, to be modified. Entry 1802 allows the description of the opportunity to be modified.

The bottom part of the user interface is used to display several different categories of information about the opportunity. A set of tabs 1803 is used to select the category of information being displayed. In the embodiment shown in FIG. 18, the Forecast tab is selected. This shows an area 1804 displaying the breakdown of the financials associated with each product class, and an area 1805 with the total financials for the entire opportunity.

Figure 19:
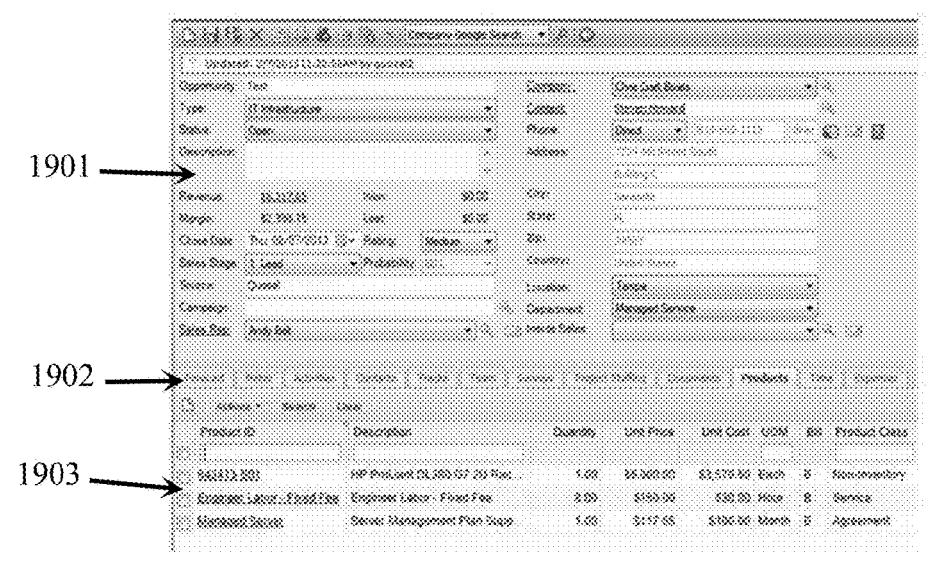

FIG. 19 illustrates an embodiment of a user interface, provided by the resource planning system 204, for managing the products associated with a single sales opportunity. The top part of the user interface 1901 is the same as previously illustrated with respect to FIG. 18. In the tabs 1902, a different tab is selected for Products. As a result, the bottom part of the user interface 1903 is modified to display the list of products that are associated with the opportunity.

Figure 20:
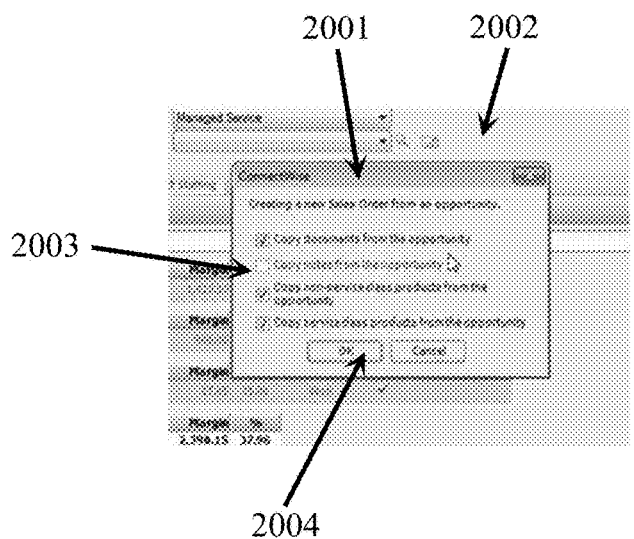
FIG. 20 is an illustrative example of an embodiment of a user interface for creating a sales order from a sales opportunity that was won.

FIG. 20 illustrates an embodiment of a user interface, provided by the resource planning system 204, for creating a sales order from a sales opportunity that was won. After the sales opportunity is won, the next step is to deliver the sale from the service provider 201 to the customer 206. Initiating this process creates a dialog box 2001 on top of the existing sales management interface 2002 (shown in part). The dialog box 2001 has a number of options 2003 about what information is copied from the sales opportunity to the sales order. After adjusting these options 2003, clicking on the OK button 2004 creates the sales order.

Figure 21:
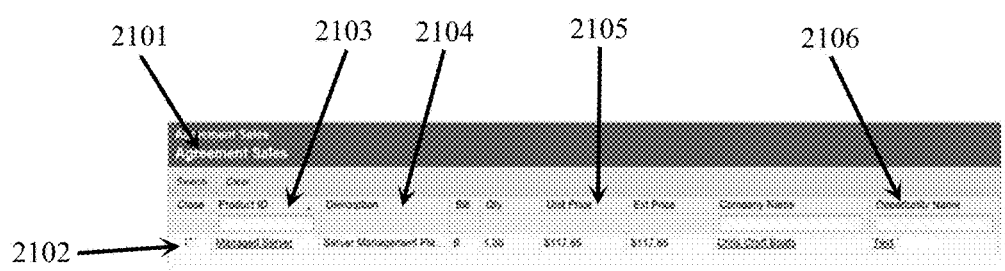
FIG. 21 is an illustrative example of an embodiment of a user interface for displaying and modifying agreements.

FIG. 21 illustrates an embodiment of a user interface, provided by the resource planning system 204, for displaying and modifying agreements products. The display 2101 shows a list of agreements products, where each row 2102 has information about one agreements product. The columns 2013-2106 display information about each agreements product. Column 2103 displays the product ID. Column 2104 displays the product description. Column 2105 displays the price of the agreements product for the customer 206. Column 2106 displays the internal name of one sales opportunity that uses the product.

Figure 22:
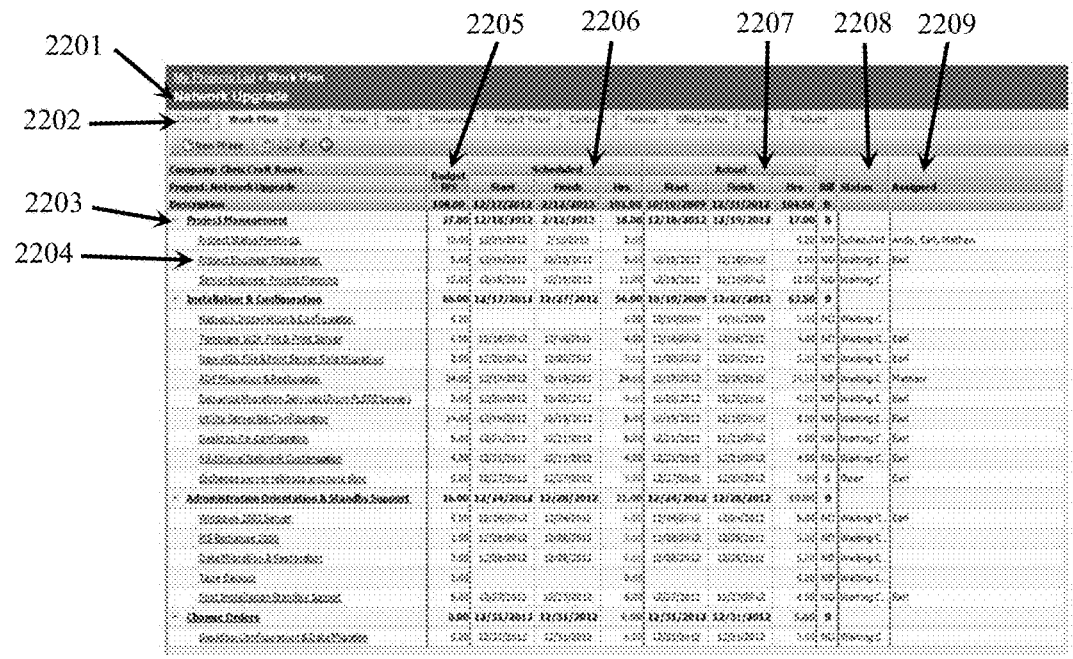
FIG. 22 is an illustrative example of an embodiment of a user interface for project management.

FIG. 22 illustrates an embodiment of a user interface, provided by the resource planning system 204, for project management. The name of the project 2201 is the label for the display. A set of tabs 2202 selects the information shown in the display. In one embodiment, the Work Plan tab is selected as shown in FIG. 22, and the display shows the groups of tasks 2203 with the individual tasks 2204 indented under the groups 2203. For each task 2204, the columns 2205-2209 display information about the task. Column 2205 displays the hours of time that are budgeted for the task. Column 2206, which comprises a group of columns, displays the details about the task scheduling: when the task is planned, and how much time is planned to finish the task. Column 2207, which is made up of a group of columns, displays the details about the timing of the task as it was actually completed: when the task was started, when the task was finished, and how much time was used to finish the task. Column 2208 displays the current status of the task. Column 2209 displays the staff members who are responsible for completing the task.

Figure 23:
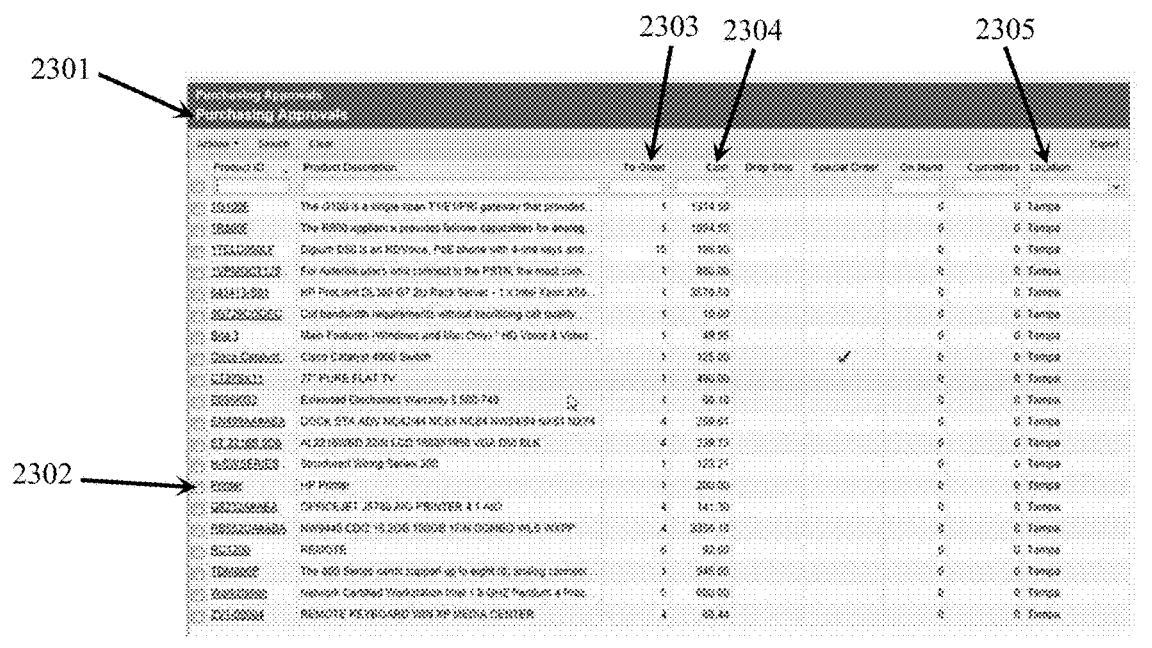

FIG. 23 illustrates an embodiment of a user interface, provided by the resource planning system 204, for managing procurement. The display header 2301 indicates that the page displays information about purchasing. The display is a list of items that need to be purchased, where each row 2302 is a single item for purchase. The columns 2303-2305 display information about each item for purchase. Column 2303 displays the quantity (number) of items to purchase. Column 2304 displays the cost of the item from the vendor 205. Column 2306 displays the location where the item should be delivered.

Figure 24:
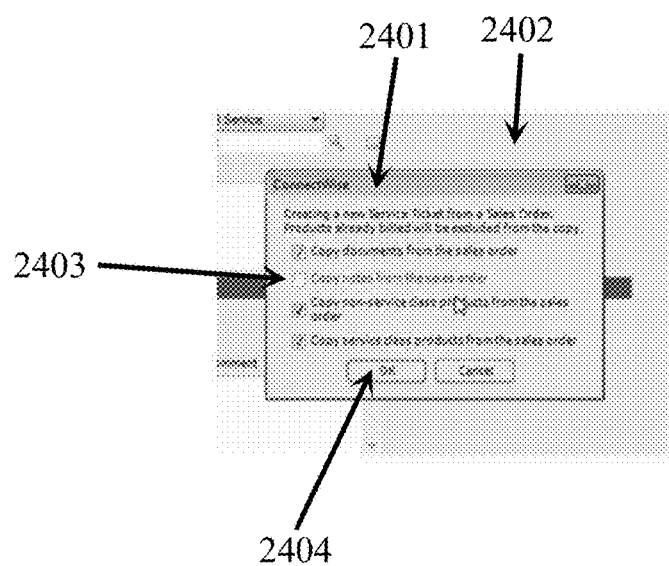
FIG. 24 is an illustrative example of an embodiment of a user interface for creating a service ticket from a sales order.

FIG. 24 illustrates an embodiment of a user interface, provided by the resource planning system 204, for creating a service ticket from a sales order. After the sales order has been planned and is ready for execution, the next step is to generate tickets to drive the implementation of the sales order by engineering. Initiating this process creates a dialog box 2401 on top of the existing sales order interface 2402 (shown in part). The dialog box 2401 has a number of options 2403 about what information is copied from the sales order to the service ticket. After adjusting these options 2403, clicking on the OK button 2404 creates the service ticket.

Figure 25:
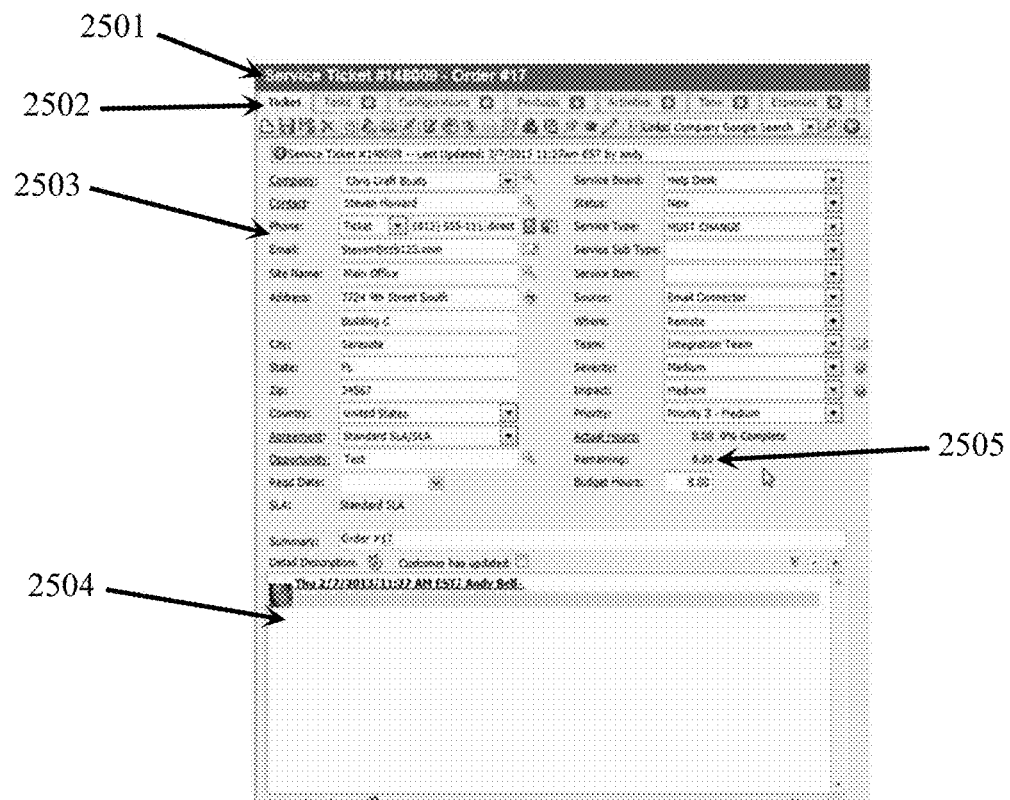
FIG. 25 is an illustrative example of an embodiment of a user interface for displaying and modifying a service ticket.

FIG. 25 illustrates an embodiment of a user interface, provided by the resource planning system 204, for displaying and modifying a service ticket. The display header 2501 indicates the name and identifier of the service ticket. A set of tabs 2502 selects the information shown in the display. In one embodiment, the Ticket tab is selected as shown in FIG. 25. As a result, the rest of the display 2503 shows information about the ticket. A large interaction area 2504 allows entry of free-form text describing any aspect of the ticket.

The initial time 2505 budgeted for the service ticket cannot be changed. This is because the value is taken from the product data 301. This makes it clear to the engineer in charge of the ticket what the expected effort is for the ticket, and when to alert management if complications are increasing the amount of labor significantly. In this way, the generation of the service ticket directly from the product data 301 greatly helps to control labor costs and manage overruns.

Figure 26:
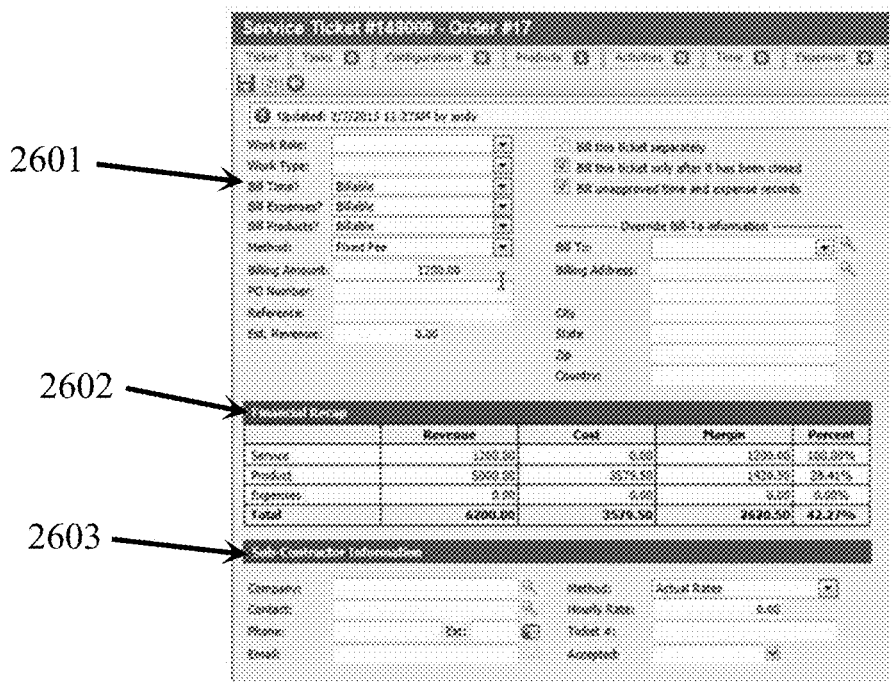
FIG. 26 is an illustrative example of an embodiment of a user interface for displaying and modifying the financial aspects of a service ticket.

FIG. 26 illustrates an embodiment of a user interface, provided by the resource planning system 204, for displaying and modifying the financial aspects of a service ticket. The tabs across the top of the interface are used to select the information that is displayed. Section 2601 displays the billing details, including the method used for computing the billing and the information for billing the customer. Section 2602 displays the summary for the customer expenses incurred by the service ticket. Section 2603 displays information about any external contractor used by the service provider 201 in order to complete the ticket.

Figure 27:
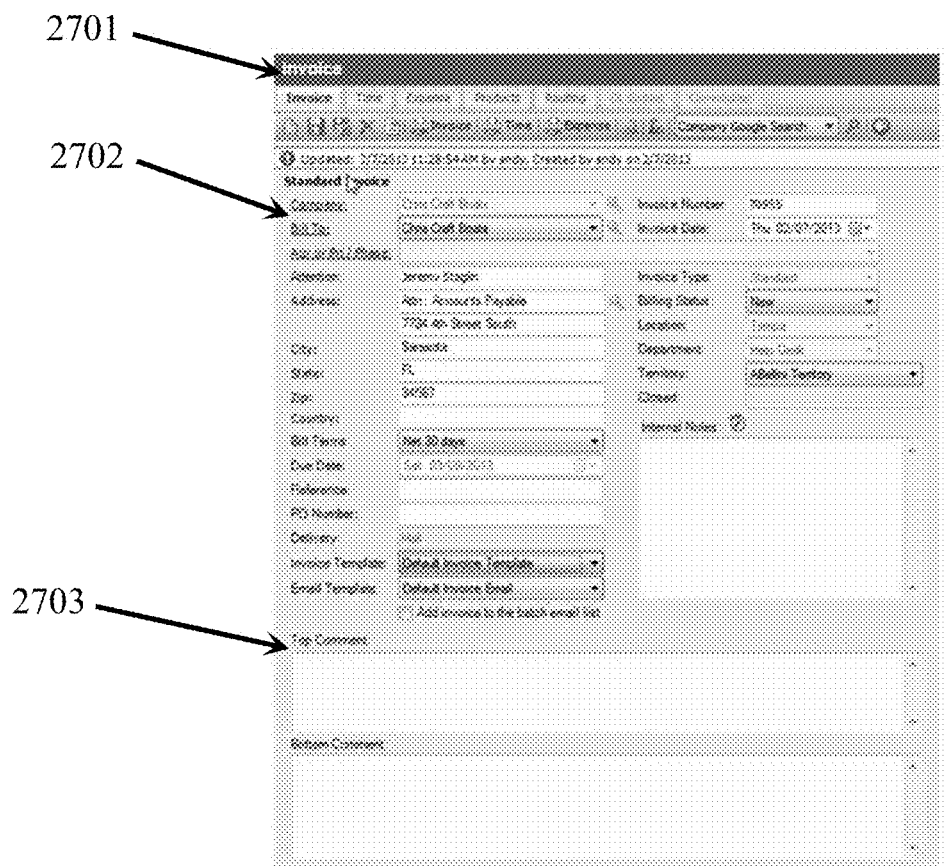
FIG. 27 is an illustrative example of an embodiment of a user interface for displaying and modifying an invoice for a customer.

FIG. 27 illustrates an embodiment of a user interface, provided by the resource planning system 204, for displaying and modifying an invoice for a customer. The display header 2701 indicates that the interface is for generating an invoice, and provides a set of tabs for controlling the information that is displayed. In one embodiment, the Invoice tab is selected as shown in FIG. 27, and the bottom area of the interface 2702 provides a viewing and editing capability for all aspects of the invoice that goes to the customer 206. The editing capability includes large text areas 2703 that allow for significant customization of the invoice.

Figure 28:
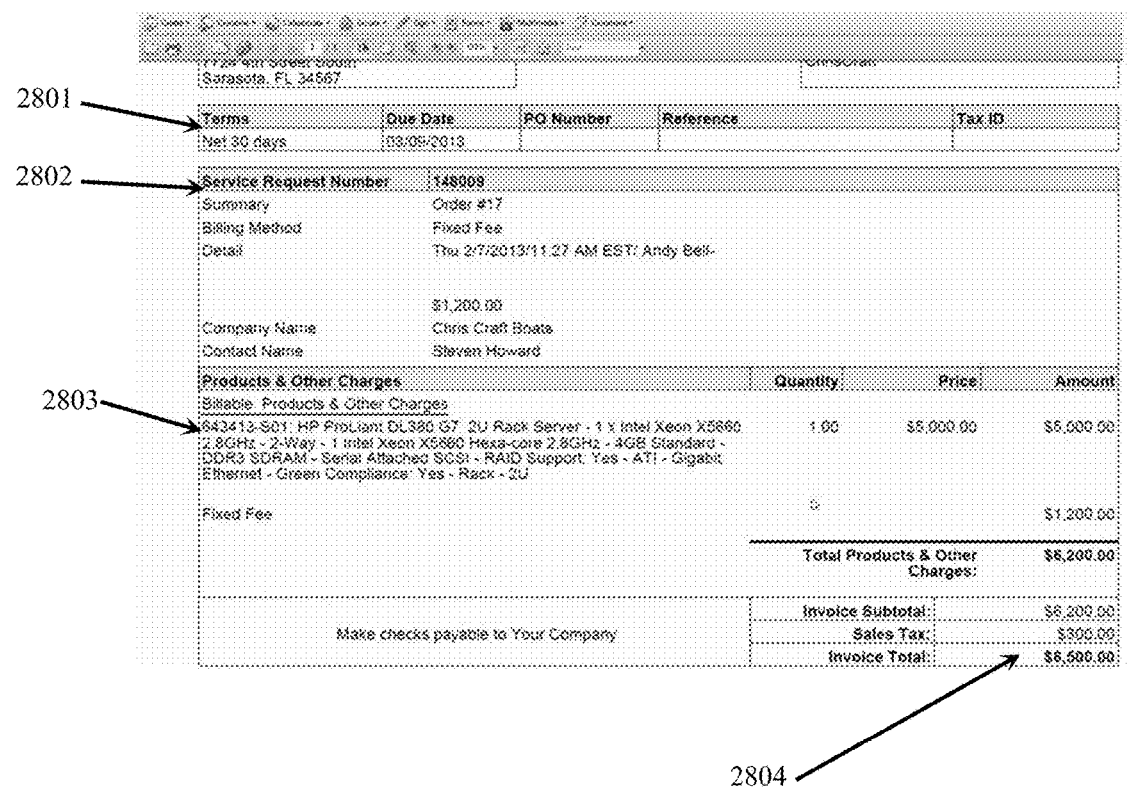

FIG. 28 illustrates an embodiment of an invoice for a customer. The invoice illustrated in FIG. 28 is generated using the interface previously described with respect to FIG. 27. Section 2801 identifies the invoice and its terms. Section 2802 lists contact information and billing information for both the service provider 201 and the customer 206. Section 2803 displays the detail about the products included in the invoice. Section 2804 summarizes the amount of the invoice for the customer 206.

Figure 29:
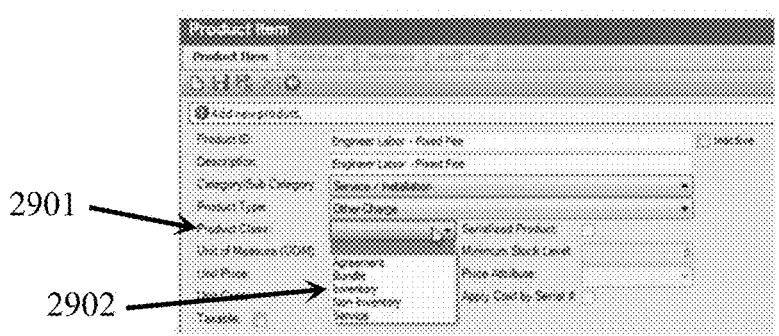
FIG. 29 is an illustrative example of an embodiment of classes for product data.

FIG. 29 illustrates an embodiment of classes for product data. The user interface shown in FIG. 29 is an instance of the user interface previously described with respect to FIG. 14. The item Product Class 2901 is implemented as a pull down 2902. The Agreement item in the pull down 2902 corresponds to agreements products 503 as previously described with respect to FIG. 5. The Bundle item in the pull down 2902 corresponds to bundles 1101 as previously described with respect to FIG. 11. The Inventory item in the pull down 2902 corresponds to inventory parts products 504 as previously described with respect to FIG. 5. The Non-Inventory item in the pull down 2902 corresponds to non-inventory parts products 505 as previously described with respect to FIG. 5. The Service item in the pull down 2902 corresponds to labor products 501 as previously described with respect to FIG. 5.

Figure 30:
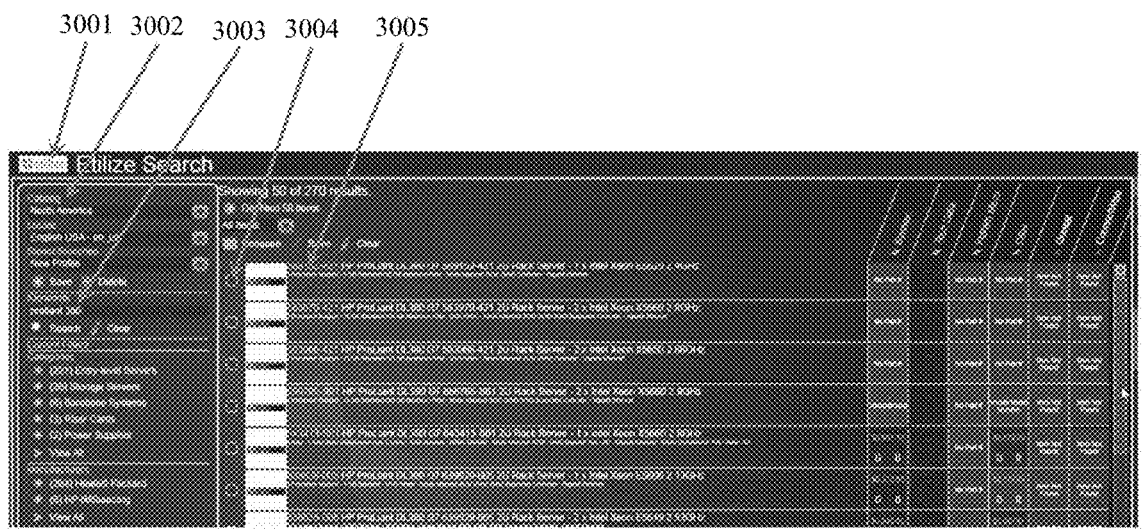
FIG. 30 is an illustrative example of an embodiment of a user interface for interfacing product data to an external product data source.

FIG. 30 illustrates an embodiment of a user interface, provided by the resource planning system 204, for interfacing product data to an external product database. The interface header 3001 displays the name of the external product database. The interface allows the product database to be selected 3002 and searched 3003 using keywords. The results of the search are shown in the right panel of the interface. Once an item is found using its detail information 3005, it can be selected 3004 and imported into the product data 301.

Figure 31:
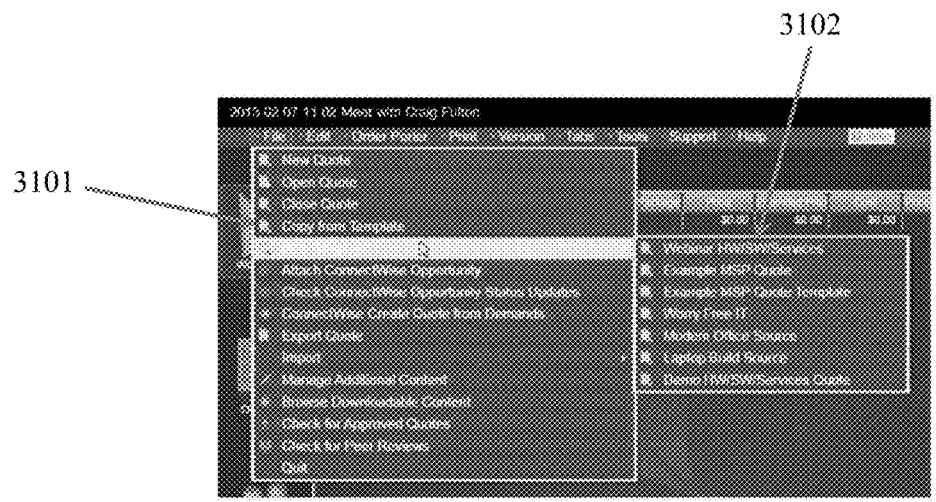
FIG. 31 is an illustrative example of an embodiment of a user interface for selecting a product template.

FIG. 31 illustrates an embodiment of a user interface, provided by the resource planning system 204, for selecting a product template. To create a new quote, one of the menu options 3101 is to copy the quote from a template. Hovering over this menu option 3101 displays a list 3102 of the available quote templates. The desired template can then be selected and used.

Figure 32:
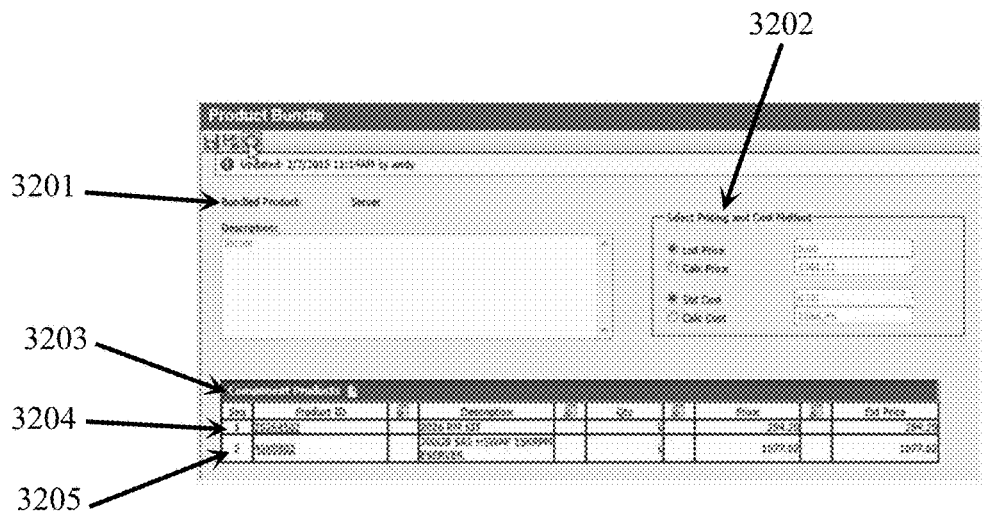
FIG. 32 is an illustrative example of an embodiment of a user interface for displaying and modifying a product bundle.

FIG. 32 illustrates an embodiment of a user interface, provided by the resource planning system 204, for displaying and modifying a product bundle 1101 as previously described with respect to FIG. 11. The display indicates the name 3201 of the bundle. Section 3202 of the user interface allows editing of the pricing options for the bundle. Section 3203 of the user interface lists the products that are included in the bundle. In one embodiment, the bundle contains two products 3204 and 3205 as shown in FIG. 32.

Figure 33:
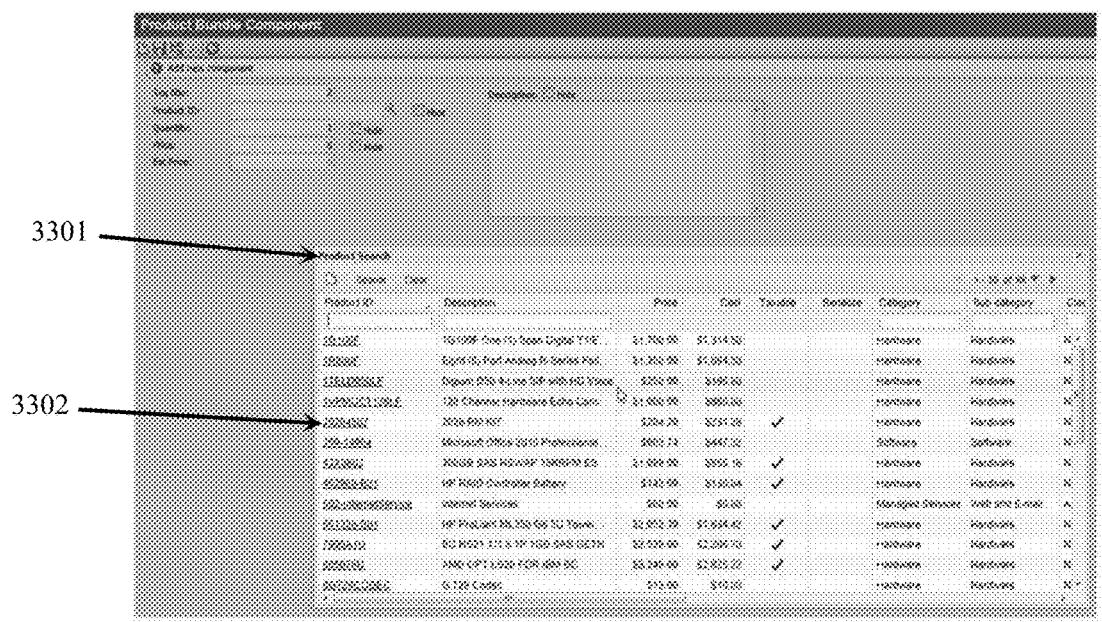
FIG. 33 is an illustrative example of an embodiment of a user interface for selecting products to include in a product bundle.

FIG. 33 illustrates an embodiment of a user interface, provided by the resource planning system 204, for selecting products to include in a product bundle. When adding a product to a bundle, the bundle user interface as previously described with respect to FIG. 32 remains in the background, and a product list 3301 is displayed on top of it. Selecting a product 3302 from the list adds it to the bundle being edited.

Figure 34A:
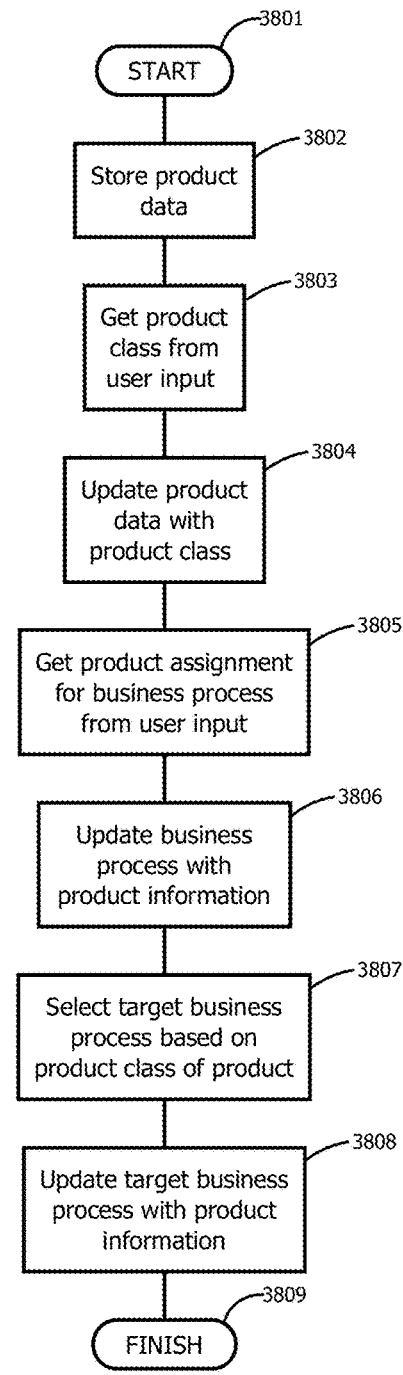
FIG. 34A is an illustrative flowchart depicting one embodiment of the steps taken to manage a business.

FIG. 34A illustrates a flowchart of an embodiment of the steps taken to manage a business. In brief overview, the process starts at step 3801. At step 3802, the process can include storing product data in a product data module. At step 3803, the process can include obtaining user input for a product class. At step 3804, the process can include associating the product class with the product data indicated by the user. At step 3805, the process can include obtaining additional user input for a business process, and at step 3806, the process can include updating the business process with the product information from the product data selected by the user. At step 3807, the process can include selecting a target business process based on the product class associated with that product data. At step 3808, the process can include updating that target business process with the product information from the business process that was updated by the user. The process finishes at step 3809.

Figure 34B:
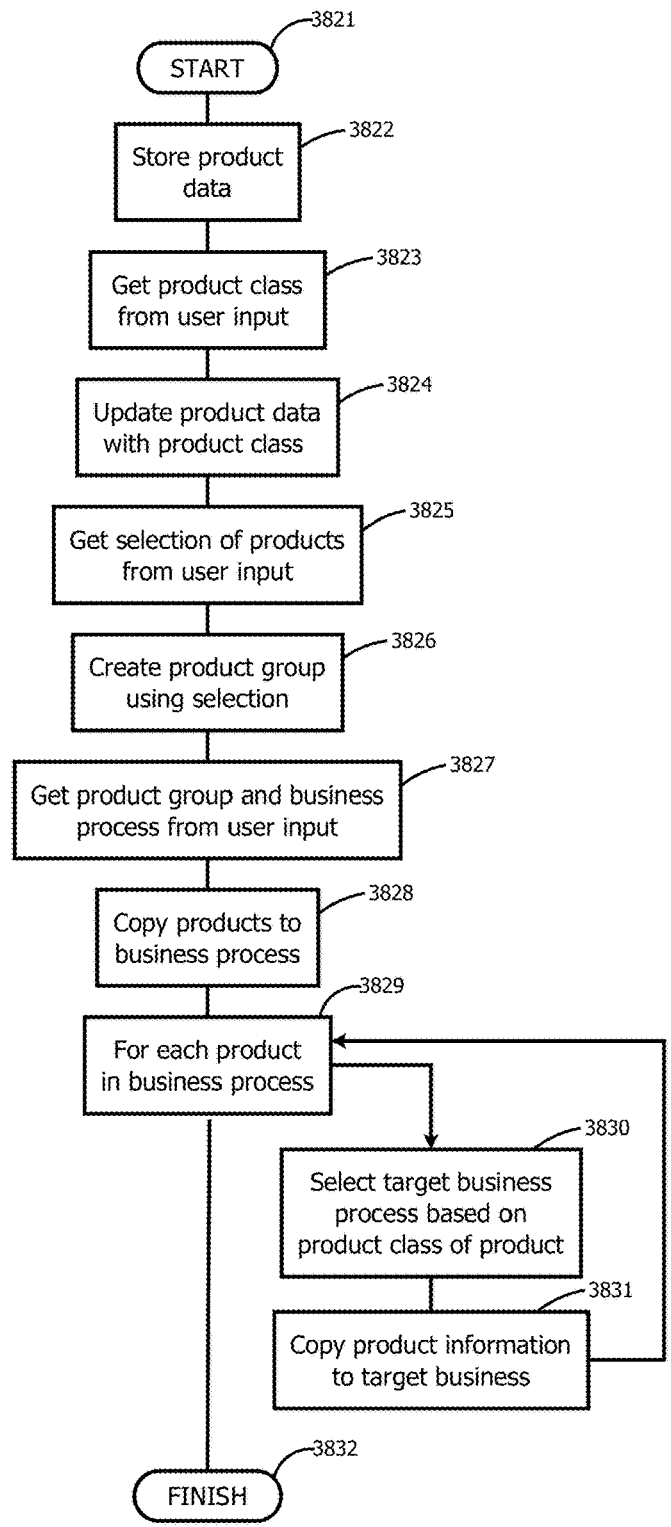
FIG. 34B is an illustrative flowchart depicting one embodiment of the steps taken to group products.

FIG. 34B illustrates a flowchart of an embodiment of the steps taken to group products. The process starts at step 3821. Step 3822 stores product data in a product data module. Step 3823 gets user input for a product class, and step 3824 associates the product class with the product data indicated by the user. Step 3825 gets additional user input for a selection of products to include in a group, and step 3826 creates the group with that selection of products. Step 3827 gets additional user input to select a group and a business process, and step 3828 copies the products in the selected group into the selected business process. The loop starting at step 3829 uses the selected business process as a source business process, and for each product in the source business process, step 3830 selects a target business process based on the product class associated with that product, and step 3831 copies the products from the source business process to the target business process. When the loop is done with all the products in the source business process, the process finishes at step 3832.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

While this specification contains many specific implementation details, these should not be construed as limitations on the scope of any inventions or of what may be claimed, but rather as descriptions of features specific to particular implementations of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A system to reduce data propagation errors between modules via a shared resource, comprising:
   a first device comprising at least one processor and memory;
   at least one additional device comprising at least one processor;
   a product data module executed by the first device to manage a data structure, in the memory of the first device, configured with a labor class to describe services performed by an entity, a parts class to describe items to be purchased and delivered to a customer, and an agreements class to describe actions performed periodically for the customer;
   the product data module executed by the first device to manage, in one or more line items of the data structure, a first product having a first product description and a product class corresponding to at least one of the labor class, the parts class or the agreements class, the product class indicating product association with one or more processing modules;
   the first device interfacing with a first application interface program (API) to convey information between the product data module and a first external processing module executed by one or more additional devices, a second API to convey information between the product data module and a second external processing module executed by one or more additional devices, a third API to convey information between the product data module and a third external processing module executed by one or more additional devices, and a fourth API to convey information between the product data module and external databases, wherein each of the first external processing module, second external processing module, third external processing module, and external databases are configured to convey information between one another via a respective API that interfaces with the product data module to reduce a number of APIs used to communicate information and reduce data propagation errors;
   a quoting module of a plurality of process modules executed by the first at least one additional device to:

retrieve, via an interface of the quoting module, from the data structure in memory managed by the product data module and communicatively coupled to the at least one processor, the one or more line items comprising the first product description of the first product managed by the product data module, the first product description including quoting information in a first format;

identify, based on the first product description, that the product class includes an agreements product;

select, from the plurality of process modules, based on the product class including the agreements product, an invoicing and collection module of the plurality of process modules configured to interface with the product data module;

transmit, to the invoicing and collection module, the first product description of the first product in the first format to enable the invoicing and collection module to create an invoice; and the invoicing and collection module executed by the at least one additional device to:

create, responsive to receiving the first product description of the first product, the invoice;

access, via an interface of the invoicing and collection module, the data structure in memory managed by the product data module executed by the first device;

modify, via the interface of the invoicing and collection module, the one or more line items for the first product in the data structure in memory managed by the product data module executed by the first device with an updated product description including invoicing information from the invoice, wherein the interface of the quoting module executed by one or more of the additional device(s) and the interface of the invoicing and collection module executed by one or more of the additional device(s) are both configured to reduce data propagation errors by accessing and updating the same one or more line items in the same data structure in memory managed by the product data module executed by the first device to cause the quoting module executed by one or more of the additional device(s) to synchronize with the invoicing and collection module executed by one or more of the additional device(s) such that the quoting information matches the invoicing information.

2. The system of claim 1, wherein a second product class comprises a parts product and further comprises a product sub-class, and the at least one processor is further configured to:

identify, based on a second product description, a product sub-class for the parts product, the product sub-class including at least one of an inventory parts products and a non-inventory parts product.

3. The system of claim 1, wherein:

the plurality of process modules comprise at least one of:
a sales management module;
a procurement module;
a delivery and setup module;
a project planning module;
an invoicing and collection module;
a payables module;
a contract management module;
a maintenance module;
a support module; and
a customer relationship management module.

4. The system of claim 1, wherein:

the first product description includes the quoting information associated with the quote generated by the quoting module; and invoicing and collection module generates a second product including a second product description, the second product including the invoice and the second product description including the invoicing information, wherein the quoting information matches the invoicing information.

5. The system of claim 1, further comprising an application programming interface to an external process module, wherein the application programming interface is communicatively coupled to the product data module and the at least one processor is further configured to:

transmit, via the product data module to the external process module, a second product;

receive, from the external process module, an external product, the external product comprising an external product description;

select, based on a product class of the external product, a third process module of the plurality of process modules;

transmit, to the selected third process module, the external product description; and control the third process module to execute a third process based on the external product description and external product class, the third process generating a third product description that substantially matches the external product description.

6. The system of claim 5, wherein the external process module comprises at least one of:
an external sales management system;
an external quoting system;
an external accounting system; and
an external product database system.

7. The system of claim 1, wherein the at least one processor is further configured to:

receive a first plurality of products, each of the first plurality of products comprising a product description;

store the first plurality of products in the product data module; and obtain a second plurality of products from the product data module, the second plurality of products comprising at least a subset of the first plurality of products and further comprising the first product description.

8. The system of claim 7, wherein the at least one processor is further configured to:

identify, based on the execution of the invoicing and collection module, a second product of the second plurality of products, the second product comprising a second product description;

identify, based on the second product description, a second product class, the second product class including at least one of a labor product, a parts product, and the agreements product;

select, based on the second product class, a third process module of the plurality of process modules, the third process module configured to interface with the product data module;

transmit, to the selected third process module, the second product description of the second product; and control the third process module to execute a third process based on at least one of the second product description and the second product class.

9. The system of claim 8, wherein the at least one processor is further configured to:

receive a user identifier corresponding to a user of the system;

set, responsive to a hiding policy, a hiding status for at least one product description of the second plurality of products;

generate a document based on the at least one product description associated with the third process module; and omit, from the document, based on the hiding status, at least one of a price and a product number of a third product description generated by the third process module.

10. A method of reducing data propagation errors between modules via a shared resource, comprising:

managing, by a product data module executed by at least one processor of a first device, a data structure, in memory of the first device, configured with a labor class to describe services performed by an entity, a parts class to describe items to be purchased and delivered to a customer, and an agreements class to describe actions performed periodically for the customer;

storing, by the product data module executed by the first device, in one or more line items of the data structure in memory communicatively coupled to the at least one processor and managed by the product data module, a first product description of a first product having a product class corresponding to at least one of the labor class, the parts class or the agreements class, the first product description in a first format associated with at least one of a plurality of process modules, the product class indicating product association with one or more processing modules;

interfacing, by the first device, with a first application interface program (API) to convey information between the product data module and a first external processing module executed by one or more additional devices;

interfacing, by the first device, with a second API to convey information between the product data module and a second external processing module executed by one or more additional devices;

interfacing, by the first device, with a third API to convey information between the product data module and a third external processing module executed by one or more additional devices, interfacing, by the first device, with a fourth API to convey information between the product data module and external databases, wherein each of the first external processing module, second external processing module, third external processing module, and external databases are configured to convey information between one another via a respective API that interfaces with the product data module to reduce a number of APIs used to communicate information and reduce data propagation errors;

retrieving, by a quoting module of the plurality of process modules executed by a second device, via an interface of the quoting module, the one or more line items comprising the first product description of the first product from the data structure in memory managed by the product data module, the first product description including quoting information in the first format;

identifying, by the quoting module executed by the second device, based on the first product description, a product class that includes an agreements product;

selecting, by the quoting module from the plurality of process modules, based on the product class including the agreements product, an invoicing and collection module of the plurality of process modules, the invoicing and collection module configured to interface with the product data module;

transmitting, by the quoting module to the invoicing and collection module executed by the second device, the first product description of the first product in the first format to enable the invoicing and collection module to create an invoice;

creating, by the invoicing and collection module executed by the second device serve responsive to receiving the first product description of the first product, the invoice;

accessing, via an interface of the invoicing and collection module executed by the second device, the data structure in memory managed by the product data module; and modifying, by the invoicing and collection module via the interface of the invoicing and collection module, the one or more line items for the first product in the data structure in memory managed by the product data module with an updated product description including invoicing information from the invoice, wherein the interface of the quoting module executed by the second device and the interface of the invoicing and collection module executed by the second device are both configured to reduce data propagation errors by accessing and updating the same one or more line items in the same data structure in memory managed by the product data module executed by the first server to cause the quoting module to synchronize with the invoicing and collection module such that the quoting information matches the invoicing information.

11. The method of claim 10, wherein a second product class comprises a parts product and further comprises a product sub-class, and the method further comprises:

identifying, based on a second product description, a product sub-class for the parts product, the product sub-class including at least one of an inventory parts products and a non-inventory parts product.

12. The method of claim 10, wherein:
the plurality of process modules comprise at least one of:
a sales management module;
a procurement module;
a delivery and setup module;
a project planning module;
an invoicing and collection module;
a payables module;
a contract management module;
a maintenance module;
a support module; and
a customer relationship management module.

13. The method of claim 10, wherein:
the first product description includes the quoting information associated with the quote generated by the quoting module; and
the invoicing and collection module generates a second product including a second product description, the second product including the invoice and the second product description including the invoicing information,
wherein the quoting information matches the invoicing information.

14. The method of claim 10, further comprising:
transmitting, via an application programming interface communicatively coupled to the product data module and an external process module, the first product updated with the invoice;
receiving, from the external process module, an external product, the external product comprising an external product description;
selecting, based on a product class of the external product, a third process module of the plurality of process modules;
transmitting, to the selected third process module, the external product description; and
controlling the third process module to execute a third process based on the external product description and external product class, the third process generating a third product description that substantially matches the external product description.

15. The method of claim 14, wherein the external process module comprises at least one of:
an external sales management method;
an external quoting system;
an external accounting method; and
an external product database method.

16. The method of claim 10, further comprising:
receiving a first plurality of products, each of the first plurality of products comprising a product description;
storing the first plurality of products in the product data module; and
obtaining a second plurality of products from the product data module, the second plurality of products comprising at least a subset of the first plurality of products and further comprising the first product description.

17. The method of claim 16, further comprising:
identifying, based on the execution of the invoicing and collection module, a second product of the second plurality of products, the second product comprising a second product description;
identifying, based on the second product description, a second product class, the second product class including at least one of a labor product, a parts product, and the agreements product;
selecting, based on the second product class, a third process module of the plurality of process modules, the third process module configured to interface with the product data module;
transmitting, to the selected third process module, the second product description of the second product; and
controlling the third process module to execute a third process based on at least one of the second product description and the second product class.

18. The method of claim 17, further comprising:
receiving a user identifier corresponding to a user of the method;
setting, responsive to a hiding policy, a hiding status for at least one product description of the second plurality of products;
generating a document based on the at least one product description associated with the third process module; and
omitting, from the document, based on the hiding status, at least one of a price and a product number of a third product description generated by the third process module.

* * * * *